(12) United States Patent
Nakano et al.

(10) Patent No.: US 9,342,768 B2
(45) Date of Patent: May 17, 2016

(54) THREE-DIMENSIONAL IMAGE PROGRAM AND PRINTER

(71) Applicant: SEIKO EPSON CORPORATION, Tokyo (JP)

(72) Inventors: Tomoyuki Nakano, Nagano (JP); Katsuhito Suzuki, Nagano (JP); Hiroshi Shirotori, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/449,897

(22) Filed: Aug. 1, 2014

(65) Prior Publication Data

US 2015/0036193 A1 Feb. 5, 2015

(30) Foreign Application Priority Data

Aug. 2, 2013 (JP) .................................. 2013-161696

(51) Int. Cl.
| | | |
|---|---|---|
| *G06K 15/02* | (2006.01) | |
| *G02B 27/22* | (2006.01) | |
| *G03B 35/18* | (2006.01) | |
| *H04N 1/407* | (2006.01) | |

(52) U.S. Cl.
CPC ............ *G06K 15/1872* (2013.01); *G02B 27/22* (2013.01); *G02B 27/2214* (2013.01); *G03B 35/18* (2013.01)

(58) Field of Classification Search
None
See application file for complete search history.

(56) References Cited

U.S. PATENT DOCUMENTS

| | | | | |
|---|---|---|---|---|
| 5,557,413 | A * | 9/1996 | Ebihara et al. | ................. 358/296 |
| 2004/0120596 | A1 | 6/2004 | Ishii et al. | |
| 2005/0174587 | A1 | 8/2005 | Hara | |
| 2007/0165027 | A1* | 7/2007 | Nakadaira | .......... G02B 27/2278 345/426 |
| 2011/0063421 | A1* | 3/2011 | Kubota | ........................... 348/52 |
| 2011/0317193 | A1 | 12/2011 | Iwase et al. | |
| 2013/0293576 | A1* | 11/2013 | Zomet | ........................... 345/629 |

FOREIGN PATENT DOCUMENTS

| | | | |
|---|---|---|---|
| JP | 07-281327 | A | 10/1995 |
| JP | 2001-042462 | A | 2/2001 |
| JP | 2001-142383 | A | 5/2001 |
| JP | 2004-206175 | A | 7/2004 |
| JP | 2005-227863 | A | 8/2005 |
| JP | 2010-165225 | A | 7/2010 |
| JP | 2012-008401 | A | 1/2012 |

* cited by examiner

*Primary Examiner* — Quang N Vo
(74) *Attorney, Agent, or Firm* — Global IP Counselors, LLP

(57) ABSTRACT

A virtual displaying method of a three-dimensional image for displaying at least one image of a plurality of images configuring a virtual three-dimensional image providing a three-dimensional visualization through a lens layer having a plurality of lenses includes applying a deterioration processing to the at least one image, and displaying, in a display section, an obtained image by the deterioration processing.

16 Claims, 8 Drawing Sheets

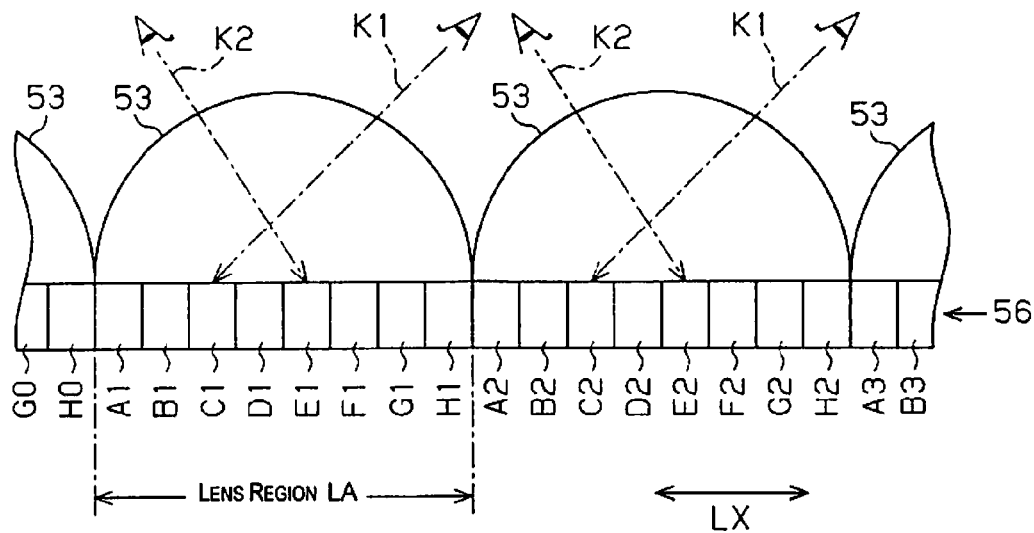
Fig. 7
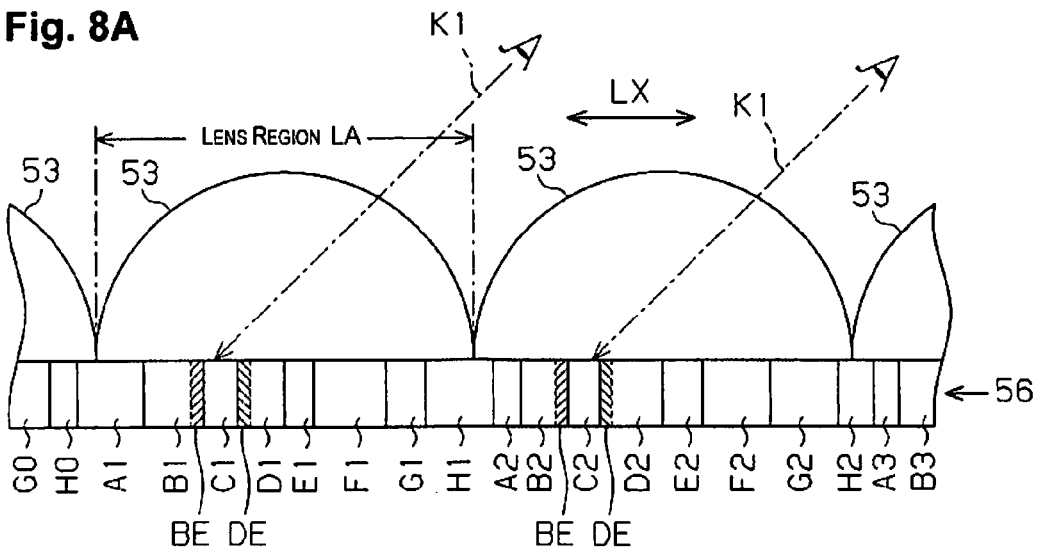
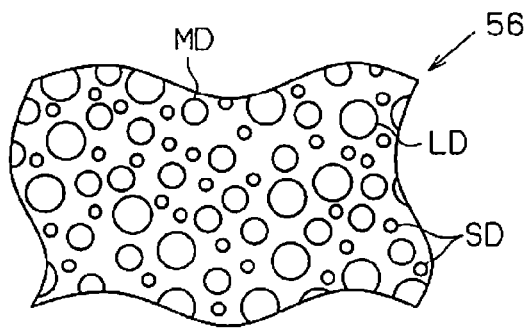
Fig. 8B

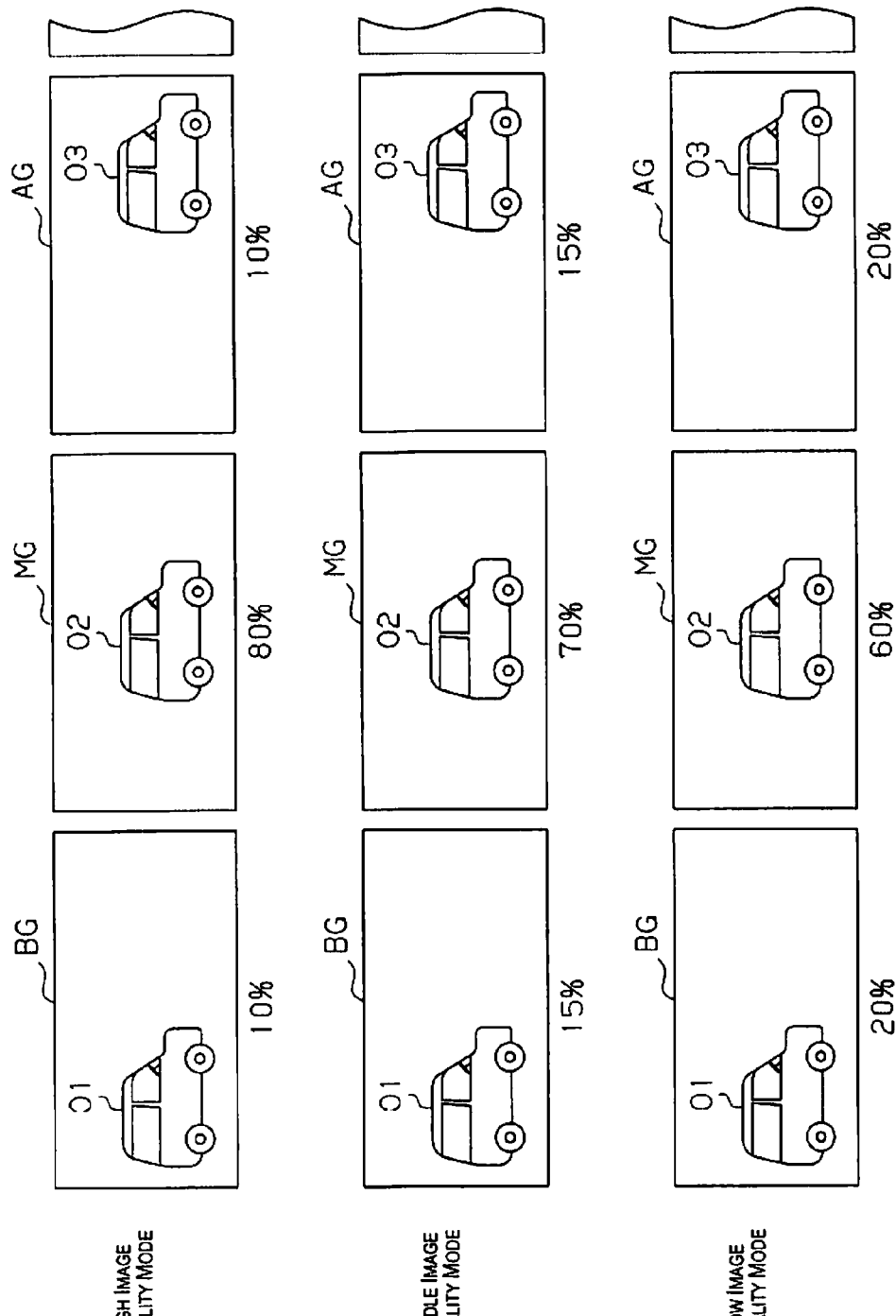

THREE-DIMENSIONAL IMAGE PROGRAM AND PRINTER

CROSS-REFERENCE TO RELATED APPLICATIONS

This application claims priority to Japanese Patent Application No. 2013-161696 filed on Aug. 2, 2013. The entire disclosure of Japanese Patent Application No. 2013-161696 is hereby incorporated herein by reference.

BACKGROUND

1. Technical Field

The present invention relates to a three-dimensional image program and a printer to display a three-dimensional image, which is capable of displaying a three-dimensional visualization through a lens layer having a plurality of lenses, in a display section.

2. Related Art

A technology is disclosed, in which a three-dimensional image is printed on a lens sheet having a plurality of lenses (e.g., cylindrical lenses) such as lenticular lenses, etc., to enable three-dimensional visualization of an image (Japanese Laid-open Patent Application Publication No. 2001-42462 and Japanese Laid-open Patent Application Publication No. 7-281327, etc.). As a three-dimensional image, it includes change images that strip shape images (linear image), a plurality of different images are respectively divided into multiple parts and are pressed in one direction, are arranged in a predetermined order, or a stereoscopic image that strip shape images (linear image), images for left eye and images for right eye (stereo pair) are respectively divided into multiple parts and are pressed in one direction, are alternately arranged, etc. It is necessary to prevent a lens sheet from a printing error since the lens sheet is relatively expensive. Therefore, a preview display to confirm a print image by the user before the printing starts is desired.

For example, Japanese Laid-open Patent Application Publication No. 2012-8401 discloses an image-forming device that is provided with a finish preview display means for three-dimensionally displaying a finish condition of a recording medium in a display panel, and a confirmation indication means for confirming and displaying a page feeding target image sequentially turned in a page unit. It reduces a printing error by easily imaging a finish condition of an actual finished recording medium before an image formation starts.

When the user enjoys a stereoscopic image or a change image by printing a three-dimensional image on a lens sheet by using a personal home printer, there is a case that an image quality of a real image viewed in a three-dimensional image through a lens is deteriorated in comparison with a case that an image is displayed in a display section because there is a program related to the printing quality of the printer, etc.

For example, a print resolution or a print position precision of an ink-jet printer is relatively low in comparison with a commercial printer that performs screen-printing or an offset printing, and in addition, the ink ejected on a recording medium is relatively and easily bled. Therefore, there is a case that a part of the linear image may be protruded to the adjacent linear image region. In this case, when the three-dimensional image is viewed through the lens layer such as lenticular lens, etc., the protruded part of the image can be seen together, and this is one of the reasons that the image relatively becomes blurring. Also, as the resolution of print dots is low, an image tends to be blurred.

Conventionally, a printer that a print image is previewed in a display section or a finish condition of a recording medium is three-dimensionally displayed (Patent Document 3) has been existed, but a printer that a real viewed image when a printed three-dimensional image is viewed through a lens layer is displayed in a display section has not been existed. For example, one of images configuring a three-dimensional image can be displayed in the display section. However, the reduction (deterioration) of resolution in a lens orthogonal direction of a cylindrical lens, the print resolution in a printer that is lower than a display resolution in a display section, the reduction (deterioration) of image quality when a three-dimensional image is viewed through the lens layer due to at least various problems such as the position precision of print dots, the bleeding of ink, etc. are not reflected. Therefore, there is a problem that the user is disappointed because the image quality is low when it is viewed through the lenticular lens after the three-dimensional image was printed.

The aforementioned problems are not limited to the ink-jet printer, and the same problems are applied to printers that other printing methods are employed. Also, it is not limited to the case that a three-dimensional image is printed on the lens sheet, and the same problems are also applied to the case that a lens layer such as a lenticular lens, etc. is bonded after the three-dimensional image was printed on a print medium, or a lens layer is formed on a print medium on which a three-dimensional image was printed by, for example, using an ink-jet recording method. In addition, it is not limited to the preview of a printing image, and in a case that a three-dimensional image is simply displayed in a display section, also, it is desired to be reflected with the deterioration of image that a real image when a three-dimensional image is viewed through a lens layer is rough or blurring. Further, it is not limited to a lenticular lens, and the same problems are also applied when other types of lens layers are used.

SUMMARY

Hereinafter, means for solving the aforementioned problems and its functions and effects will be described.

The method to solve the aforementioned problems is a virtual displaying method of a three-dimensional image for displaying at least one image of a plurality of images configuring a virtual three-dimensional image providing a three-dimensional visualization through a lens layer having a plurality of lenses. The virtual displaying method comprises applying a deterioration processing to the at least one image, and displaying, in a display section, an obtained image by the deterioration processing. Here, the phrase "a plurality of images configuring a virtual three-dimensional image" indicates a plurality of images that are respectively configured by a plural numbers of linear images included in a three-dimensional image. That is, when the three-dimensional image is viewed through the lens layer, it is a plurality of observed images (e.g., in a case of change images) when viewed in different angles or a plurality of observed images (in a case of a stereoscopic image) when viewed at the same time. At least one image among the plurality of images displayed in the display section is an image virtually observed when the three-dimensional image is viewed through the lens layer so that it may be preliminary prepared as a two-dimensional image.

Needless to say, the plural numbers of linear images belonging to the same image of the three-dimensional image are extracted and composed to one image, and the composite image is expanded in a linear image sequence direction and one image may be generated.

According to this structure, in an image deterioration step, the deterioration processing is applied to at least one image among the plurality of images that configure the three-dimensional image. In a display step, the image obtained in the image deterioration step is displayed in the display section. Therefore, a virtual image that is reflected with the deterioration of the image when the three-dimensional image is viewed through the lens layer can be displayed in the display section.

Further, in the method, it is preferable that at least more than or equal to two images in the plurality of images used for generating a deterioration image includes a main image and at least one of other images used for deteriorating the main image, and the deterioration processing includes a semi-transmissive processing that is applied to the at least one of the other image in the main image and the other image, and at least more than or equal to two images including the image to which the deterioration processing including the semi-transmissive processing has been applied are composed.

According to this structure, in the image deterioration step, the deterioration processing including the semi-transmissive processing is applied to at least another image among the main image and at least one of other images among the plurality of images. More than or equal to two images including the image applied by the deterioration processing, which includes the semi-transmissive processing, are composed, and the deterioration image is generated. In the display step, the deterioration image is displayed in the display section. Therefore, a virtual image, which is close to a real image that another image other than the main image is thinly viewed when the three-dimensional image is viewed through the lens, can be displayed in the display section.

Further, in the method, it is preferable that the deterioration processing includes the semi-transmissive processing that is applied to the at least one of the other images in the more than or equal to two images, and a blurring processing that is applied to the more than or equal to two images.

According to this structure, in the image deterioration step, the semi-transmissive processing is applied to at least the other image among more than or equal to two images, and a blurring processing is applied more than or equal to two images. The main image and the other image applied by these processing after the deterioration processing are composed and the deterioration image is generated. Therefore, when, for example, a printed matter of the three-dimensional image is viewed through the lens layer, a virtual image that the other image is thinly viewed and is similar to the blurring image due to the low print resolution can be displayed in the display section.

Further, in the method, it is preferable that the virtual three-dimensional image is a change image that changes a plurality of the images depending on an angle viewing through the lens layer, and the applying of the deterioration processing includes increasing a transparency when the semi-transmissive processing is applied to the at least one of the other images, as a disparity relative to the main image increases.

According to this structure, in the image deterioration step, as the disparity with respect to the main image increases, a translucent processing is applied to the other image in high transparency. Thus, the virtual image that as the disparity with respect to the main image increases, the other image gradually decreases with the main image can be displayed in the display section.

Further, in the method, it is preferable that the displaying of the obtained image includes previewing the virtual three-dimensional image in the display section before printing in a printer, and the applying of the deterioration processing includes, when a print mode in which the virtual three-dimensional image is printed in the printer is a high image quality mode, lowering a deterioration degree of the image in comparison with a low image quality mode.

According to this structure, when it is high image quality mode, the deterioration degree of the image by the deterioration processing is lower than the case of the low image quality mode. Therefore, the image, which is the view when the three-dimensional image is viewed through the lens layer, can be displayed in the deterioration degree corresponding to the print image quality in response to the print mode in the display section.

Further, in the method, it is preferable that the applying of the deterioration processing includes applying the deterioration processing to, in a plurality of pixels configuring the at least one of the other images, a pixel of which a pixel value exceeds a threshold value in a darker side in a print color system in which the at least one of the other images is color-converted, and composing the pixel after the deterioration processing are composed with the main image.

According to this structure, the pixels that a color value (e.g., RGB value) is small in an image of, for example, a display color system (e.g., RGB system) are high density in CMYK at the time of printing. In a case that the density of pixels is high at the time of printing, for example, the large dots are formed by the large ink drop when the dots are formed by the ink drop in a plurality of sizes. On the other hand, in a case that a size of the ink drop is fixed, the impact density becomes high. Thus, when the density of the pixels is high (dense) at the time of printing, the ink amount per unit area increases, and it easily bleeds to a division compression image of an adjacent image. Therefore, the deterioration processing is applied to the pixels that the pixel value of the plurality of pixels configuring the other image exceeds the threshold value in a high density side in the print color system. That is, the deterioration processing is applied to the pixels that the ink amount is large and the ink is easily bled when it is converted from the display color system to the print color system. Accordingly, the part (large dots or part where dot density is high) (pixels) where the ink amount is large and the ink is easily bled to the adjacent division compression image when the three-dimensional image is viewed through the lens layer is thinly viewed in the main image so that more real image can be displayed in the display section.

Further, in the method, it is preferable that the virtual three-dimensional image is configured by arranging division compression images of each of the plurality of the images along an arrangement direction of the lenses, and the applying of the deterioration processing includes applying the deterioration processing to, in the at least one of the other images, a part corresponding to an end part of a division compression image arranged adjacent to a division compression image of the main image, the end part being close to the division compression image of the main image side, and composing the part after the deterioration processing is composed with the main image.

According to this structure, when the border part of the division compression image is protruded to the adjacent division compression image region, the image of the protruded part that should not be essentially seen is viewed through the lenses, and it causes the blurring of the image. In the other image, the deterioration processing is applied to the part corresponding to the end part in a division compression image, which is arranged adjacent to the division compression image of the main image and in the division compression image of the main image side. The part after the deterioration processing was applied is composed to the main image. Thus, a condition that the other image part corresponding to the part protruded from adjacent part is thinly viewed when the three-dimensional image is viewed through the lens layer can be displayed in the display section.

Further, in the method, it is preferable that the virtual three-dimensional image is a change image including the plurality of the images, and the applying of the deterioration processing includes, in the plurality of the images configuring the change image, when one image of which a division compression image is arranged at an end of a lens is the main image, applying the deterioration processing to an image corresponding to an adjacent division compression image arranged in an end of an adjacent side in a lens adjacent to the lens, and the image after the deterioration processing is composed with the main image.

According to this structure, in the plurality of images configuring the change images, when one image that a division compression image is arranged in a lens side is the main image, the deterioration processing is applied to the image corresponding to an adjacent division compression image arranged in an end of the adjacent side in a lens adjacent to the lens, and the image after the deterioration processing is also composed to the main image. Therefore, even though the image becomes a reverse viewing, the image, which is thinly viewed in the main image, can be also displayed in the display section.

Further, in the method, it is preferable that the virtual three-dimensional image virtualizes the three-dimensional image drawn by dots in a plurality of sizes, and the applying of the deterioration processing includes applying a semi-transmissive processing that reduces a transparency, in comparison with other parts, to a part that includes the largest dot in the plurality of the sizes in the at least one of the other images. In this case, when the semi-transmissive processing is applied to the largest dots, the semi-transmissive processing may be applied or may not be applied to other dots. When the semi-transmissive processing is applied to other dots, the transparency may be increased more than the transparency of the semi-transmissive processing that is applied to the largest dots.

According to this structure, the three-dimensional image drawn by the dots in the plurality of sizes is virtualized, and the semi-transmissive processing that reduces the transparency in comparison with other parts is applied to the part configured by the largest dots in the plurality of sizes in another image. Accordingly, the relatively large dot part can be displayed to be seen as to relatively increase density in the main image in the display section. Also, when other parts become transparent, the part that can be the large dots is displayed with main image together.

Further, in the method, it is preferable that the virtual three-dimensional image is a stereoscopic image including an image for left eye and an image for right eye as the plurality of the images, and the deterioration processing is applied to at least one of the image for left eye and the image for right eye, which is not the main image to be displayed in the display section in the image for left eye and the image for right eye, and the at least one of the image for left eye and the image for right eye which the deterioration processing has been applied to and the main image are composed.

According to this structure, in the image deterioration step, the deterioration processing is applied at least the other image, which is not the main image to be displayed in the display section, in the image for left eye and the image for right eye, and a deterioration image is generated by composing the other image after the deterioration processing and the main image. By displaying the deterioration image in the display section in the display section, an image that is similar to the image when the stereoscopic image is viewed through the lens layer can be displayed in the display section.

Further, in the method, it is preferable that the lens layer is a lenticular lens, and the virtual displaying method further comprises, before the applying of the deterioration processing or after the displaying of the obtained image, position-adjusting a first stereoscopic object and a second stereoscopic object in a lens longitudinal direction until a displacement amount between the first stereoscopic object included in the image for left eye and the second stereoscopic object included in the image for right eye in the lens longitudinal direction is fit within an acceptable range when the displacement amount exceeds the acceptable range.

According to this structure, a first stereoscopic object and a second stereoscopic object are position-adjusted in a lens longitudinal direction until a displacement amount is fit within an acceptable range when the displacement amount between the first stereoscopic object included in the image for left eye and the second stereoscopic object included in the image for right eye in the lens longitudinal direction exceeds the acceptable range. Therefore, the images for left eye and the images for right eye capable of stereoscopically showing the stereoscopic objects in a state of little blurring caused by position displacement when viewing through the lens can be obtained.

Further, in the method, it is preferably provided with comprising trimming by removing a part that does not form the virtual three-dimensional image in the plurality of the images after the position-adjusting.

According to this structure, a part that the three-dimensional image is not formed in the plurality of images after the position adjustment is excluded by the trimming. Accordingly, by using the image for left eye and the image for right eye after the trimming, the object can be stereoscopically viewed without a blank space when viewing through the lens layer.

Further, in the method, it is preferable that the position-adjusting includes position-adjusting the first stereoscopic object and the second stereoscopic object based on an instruction from an operating section operated by a user.

According to this structure, by operating the operating section by the user, the position displacement between the first stereoscopic object and the second stereoscopic object in the lens longitudinal direction LY can be adjusted to be smaller by hand.

Further, in the method, it is preferable that the position-adjusting includes calculating the displacement amount of the first and second stereoscopic objects in the lens longitudinal direction from a position of each of the first and second stereoscopic objects obtained by performing a characteristic extraction to the image for left eye and the image for right eye, and position-adjusting the image for left eye and the image for right eye in the lens longitudinal direction until the displacement amount is fit in the acceptable range.

According to this structure, the displacement amount of the stereoscopic objects in the lens longitudinal direction is calculated from the positions of the respective stereoscopic objects obtained from the characteristic extraction for the image for left eye and the image for right eye, and when the displacement amount exceeds the acceptable range, the positions of the stereoscopic objects are automatically adjusted to fit the displacement amount within the acceptable range. Therefore, the user does not have to take an image again or does not have to perform a hand adjustment.

Further, the method further includes adjusting a specific image that is a part in the plurality of images configuring the virtual three-dimensional image, and reflecting a result of the adjusting to an image other than the specific image in the plurality of the images, and the adjusting of the specific image and the reflecting of the adjustment result are performed before the applying of the deterioration processing or after the displaying of the obtained image.

According to this structure, when a part of the specific image in the plurality of images is adjusted, the adjustment result is reflected to other images other than the specific image. As a result, the necessary operation steps for adjustment performed by the user are reduced.

BRIEF DESCRIPTION OF THE DRAWINGS

Referring now to the attached drawings which form a part of this original disclosure:

FIG. 7 is a schematic front view showing enlarging the three-dimensional image sheet;

FIG. 8A is an enlarged front view explaining blurring, etc. of a linear image of the three-dimensional image sheet;

FIG. 8B is a schematic view showing a formation of dots that forms the three-dimensional image;

FIG. 9A is an explanatory diagram explaining a deterioration processing in response to a print image quality mode;

FIG. 9B is an explanatory diagram explaining the deterioration processing in response to the print image quality mode;

FIG. 9C is an explanatory diagram explaining the deterioration processing in response to the print image quality mode;

DETAILED DESCRIPTION OF EXEMPLARY EMBODIMENTS

First Embodiment

Hereinafter, one embodiment of programs and a printer will be explained in reference to FIG. 1 to FIG. 11.

Figure 1:
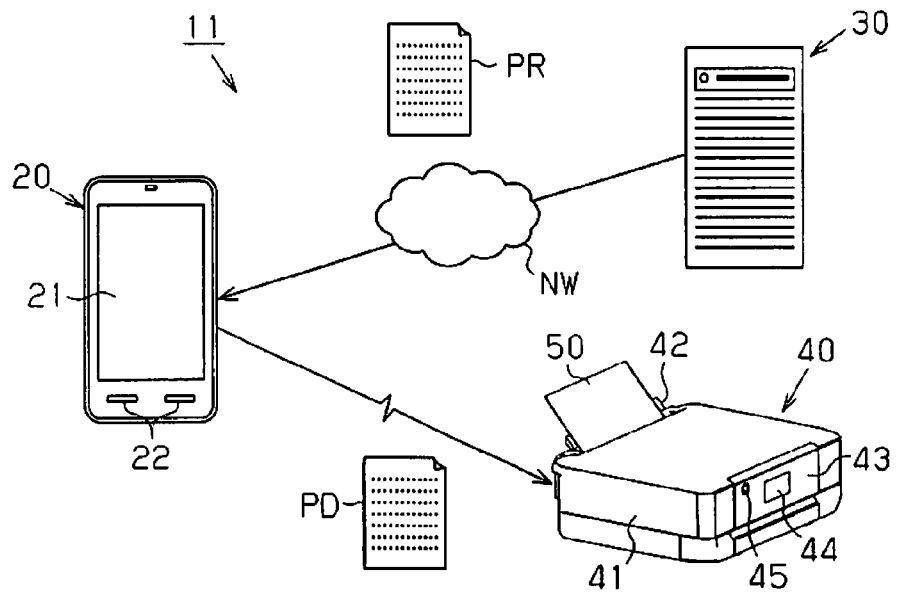
FIG. 1 is a schematic view showing a print system according to a first embodiment.

A print system 11 as shown in FIG. 1 is a system that can print a three-dimensional image on a lens sheet. The print system 11 is provided with a mobile terminal 20 that performs operations to instruct a displaying or a printing an image by the user, a server 30 that provides contents aimed at printing of the three-dimensional image to the mobile terminal 20, and a printer 40.

The plural kinds of contents are stored in the server 30. The user downloads the program PR to the mobile terminal 20 through the internet NW in a charge or free of charge. The program PR downloads a part of the contents with the desired tertiary viewing image data GD.

The mobile terminal 20 is provided with a display section 21 and an operating section and the screen of the display section 21 is capable of performing touch operations so as to operate various instructions. The display section 21 is capable of previewing so as to confirm the three-dimensional image before printing. Also, when the preview confirmation is acceptable, the user instructs the execution of printing by operating the operating section 22 or the screen touch operation by the user. At this time, the user preliminary sets a print condition if necessary. Here, one of the print conditions is "print mode". In the print modes, there are "high image quality mode" which prioritizes the print image quality than the print speed, "low image quality mode" which prioritizes the print speed than the print image quality, and "middle image quality mode" which prioritizes both the print image quality and the print speed. When the user operates the mobile terminal 20 to instruct the execution of printing, the print data PD for three-dimensional image is transmitted from the mobile terminal 20 to the printer 40.

The mobile terminal 20 includes a smartphone, a mobile phone, a tablet PC, a personal digital assistant (PAD (Personal Digital Assistants)), etc. Non-portable type host device may be used instead of the mobile terminal 20, and for example, it may be a personal computer.

The printer 40 has a main body 41 that has a rectangular parallelepiped shape, a manual paper feeding section 42 that is capable of setting a medium on the backside of the main body 41, and an operation panel 43 that is provided in the front surface (right front surface in FIG. 1) of the main body 41. A lens sheet 50 as one example of the medium is set in an oblique set posture in the feeding section 42. The lens sheet 50 has a lens layer with a lenticular lens, etc. on the entire surface and the other surface is a printing surface. The operation panel 43 is provided with a display section 44 and an operating section 45. In the present embodiment, the touch panel function of the display section 44 also configures one part of the operating section. When the printer 40 receives the print data PD from the mobile terminal 20, an image including the three-dimensional image is printed based on the print data PD while the lens sheet 50 is fed.

Figure 2:
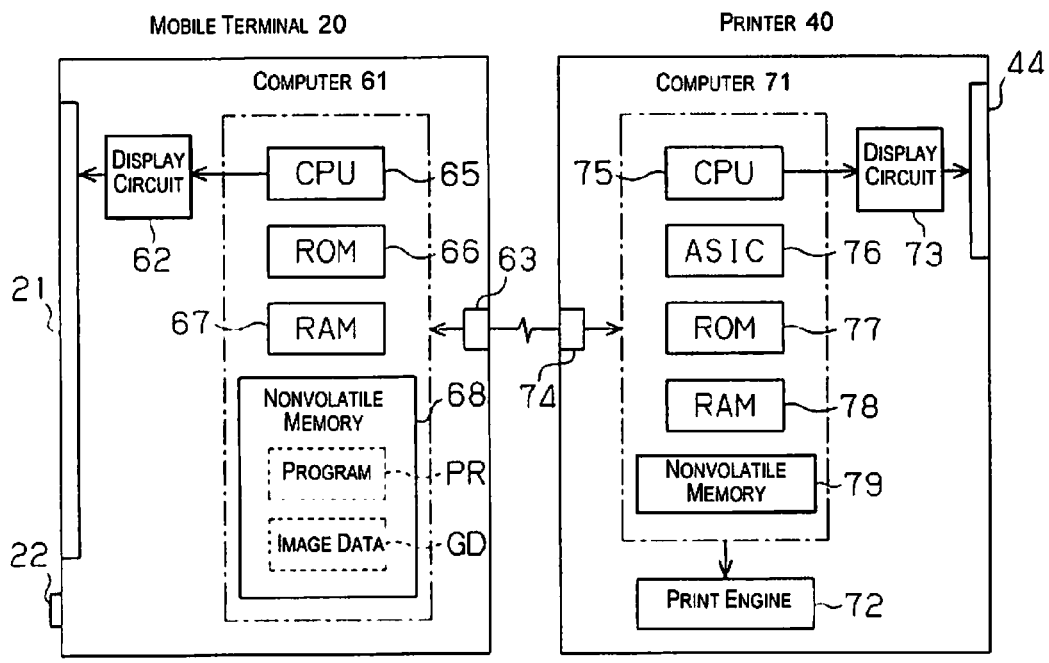
FIG. 2 is a block diagram showing an electrical constitution of a mobile terminal and a printer.

Next, the electrical constitution of the mobile terminal 20 and the printer 40 will be explained in reference to FIG. 2. As shown in FIG. 2, the mobile terminal 20 is provided with a computer 61, a display circuit 62, and a communication section 63.

Further, the mobile terminal 20 has a communication circuit, a microphone, a speaker (not shown in the drawing), etc. built-in. The computer 61 is provided with a CPU 65 (Central Processing Unit) a ROM 66, a RAM 67, and a nonvolatile memory 68 as one example of a recording section. Various programs to realize various functions in the mobile terminal 20 such as programs to realize telephone function are stored in the ROM 66. Also, the program PR and the image data GD configuring contents downloaded from the server 30 are stored in the nonvolatile memory 68. The image data GD is the image data for preview, and includes other print data PD. The CPU 65 performs a preview processing by executing the program PR. The CPU 65 previews a virtual image when viewing the three-dimensional image through the lens layer in the display section 21 via the display circuit 62 based on the image data generated in the preview processing. The CUP 65 may perform a print image generation processing that converts the three-dimensional image data to the print data by executing the program PR.

Further, as shown in FIG. 2, the printer 40 is provided with a computer 71, a print engine 72, a display circuit 73 and a communication section 74 that manage overall control of the printer. The mobile terminal 20 and the printer 40 are capable of performing a wireless communication through the communication sections 63, 74. The transmission of the print data from the mobile terminal 20 to the printer 40 wirelessly performs through the communication sections 63, 74.

The computer 71 shown in FIG. 2 is provided with a CPU (Central Processing Unit) 75, an ASIC (Application Specific IC) 76, a ROM 77, a RAM 78, and a nonvolatile memory 79 as one example of a recording section. Various programs including OS that uses in the printer 40 are stored in the ROM 77. Various control programs, etc. that are required for various controls of the printer 40 are stored in the nonvolatile memory 79.

When the printer 40 has a structure that is communicable with the server 30, the program PR and the image data GD configuring contents downloaded from the server 30 may be stored in the nonvolatile memory 79. In this case, the virtual image, which is the view when the three-dimensional image is viewed through the lens layer, is displayed by the CPU 75 based on the image data generated in the preview processing in the display section 44 through the display circuit 73.

The print engine 72 shown in FIG. 2 is provided with a print head 48 (see FIG. 4 and FIG. 5), and a conveyance motor, which is not shown, that is a power source of a conveyance mechanism having a conveyance roller pair 46 (see FIG. 4) that conveys a print medium such as a lens sheet 50, a paper, etc. The printer 40 of the present embodiment is a serial printer as an example. When the printer 40 receives the print data PD with the instruction of the lens sheet printing, the print engine 72 alternately repeats a conveyance movement that conveys the lens sheet 50 by driving the conveyance mechanism, and a print movement that ejects ink drops from the nozzles of the print head 48 by moving a carriage 49 in a main scanning direction X. Therefore, the printer 40 prints an image on the printing surface of the lens sheet 50 based on the print data PD.

Figure 3:
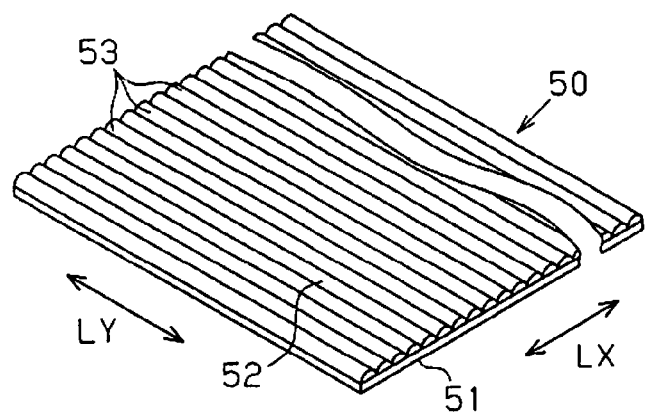
FIG. 3 is a partially broken perspective view showing a lens sheet.

As shown in FIG. 3, the lens sheet 50 is provided with an ink absorbing layer 51 and a lens layer 52. The ink absorbing layer 51 is configured by a film forming a high ink absorbent material, and is bonded to the bottom surface of the lens layer 52 via a transparent adhesive tape or adhesive agent. Needless to say, the ink absorbing layer 51 may be adhered to the bottom surface of the lens layer 52.

As shown in FIG. 3, the plural numbers of lenses 53 that extend in a state that they are parallel to each other along one direction and next lenses are adjacent to each other are formed in the lens layer 52. In the lens layer 52 of the present embodiment, the lenses 53 are, for example, a lenticular lens configured by a cylindrical lens. The lenses 53 have, for example, a semicircle shape in a cross-section that cuts the lenses in a direction (cross direction) perpendicular to the longitudinal direction. In the following explanation, there is a case that in the lens sheet 50, the longitudinal direction of the lenses 53 is called as "lens longitudinal direction LY", and the direction perpendicular to the lens longitudinal direction is called as "lens orthogonal direction LX".

Figure 4:
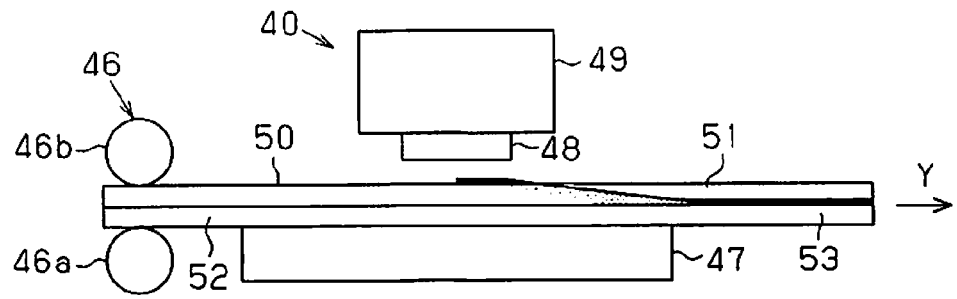
FIG. 4 is a side view showing the structure of a print engine for printing a lens sheet.
Figure 5:
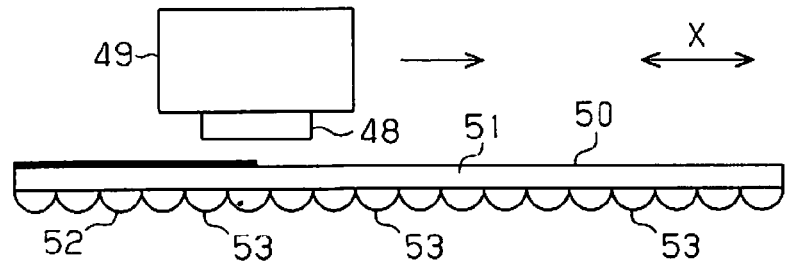
FIG. 5 is a front view showing the structure of the print engine for printing the lens sheet.
Figure 6:
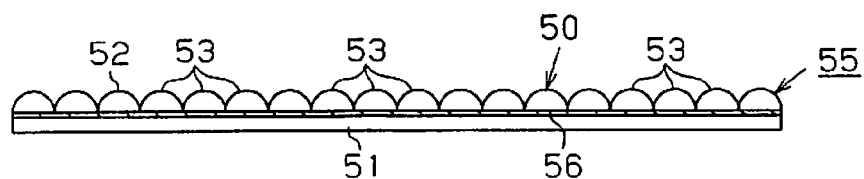
FIG. 6 is a front view showing the three-dimensional image sheet.

FIG. 4 to FIG. 6 explain a formation process of a three-dimensional image sheet 55. The three-dimensional image sheet 55 that is capable of providing a three-dimensional visualization of an image is formed by printing the three-dimensional image on the printing surface of the lens sheet 50. When the printing starts, the lens sheet 50 set in the feeding section 42 of the printer 40 as shown in FIG. 1 is fed to the print start position in the main body 41. As shown in FIG. 4, the conveyance roller pair 46 having a drive roller 46a and a drive roller 46b opposite to each other through the conveying route is arranged in the main body 41. The lens sheet 50 is fed to the downstream side of the conveyance direction Y by driving the conveyance roller pair 46 while supporting by a supporting member 47. The print head 48 opposite to the supporting member 47 through the conveyance route is fixed below the carriage 49 that is capable of moving in a direction that intersects the conveyance direction Y. The printing proceeds by ejecting ink drops from the nozzles of the print head 48 to a part of the surface (printing surface) in the lens sheet 50 supported by the supporting member 47. As shown in FIG. 4, the ink dropped on the printing surface of the lens sheet 50 is absorbed to the ink absorbing layer 51, and penetrates to near the bottom surface (boundary surface) of the lens layer 52. The engageable convex parts corresponding to an irregular shape formed by the lenses 53 of the lens layer 52 on the support surface of the supporting member 47 may form the convex-concave surface in the semicircle shape.

As shown in FIG. 5, the carriage 49 is reciprocally moved in the main scanning direction X intersecting the conveyance direction Y by the power fed from the carriage motor which is not shown in the drawing. The print head 48 ejects the ink drops from the nozzles while moving it in the main scanning direction X. An image is printed on the printing surface of the lens sheet 50 by approximately and alternately performing the printing operation, which moves the carriage 49 with the ejection of the ink drops in the main scanning direction X at once, and the intermittent conveyance movement in the conveyance direction Y of the lens sheet 50. The ink dropped on the printing surface of the ink absorbing layer 51 is absorbed in the ink absorbing layer 51, and it is penetrated and fixed to a vicinity of an interface with respect to the lens layer 52. The ink absorbing layer 51 is formed by a transparent material except the white surface layer. Therefore, the image is viewed so as to be arranged on the white material through the lens layer 52.

The three-dimensional image sheet 55 is provided in the way as shown in FIG. 6. As shown in FIG. 6, the three-dimensional image 56 is formed between the ink absorbing layer 51 and the lens layer 52 in the three-dimensional image sheet 55. The three-dimensional image 56 is change images that sequentially changes a plurality of images by viewing in different angles through the lens layer 52, or a stereoscopic image that can stereoscopically view an object in the image 56 when an image for left eye and an image for right eye are respectively viewed by left eye and right eye through the lens layer 52. In the description below, there is a case that the lens sheet 50 is just called as "sheet 50".

As shown in FIG. 7, the three-dimensional image is configured by alternately arranging the respective N images (N represents natural number of more than or equal to two), which are compressed to 1/N times in the lens orthogonal direction LX, in the order that a total of N×P linear division compression images (hereinafter referred to as "Linear image") A1, B1, ..., H1, etc., which are divided into the same number as the numbers of lenses P in the lens orthogonal direction LX, etc., is changed. N images (e.g., 8 images) are represented as image A, image B, image C, ... image H, and the respective corresponded linear images are represented as linear images A1 to AP, linear images B1 to BP, ..., Linear images H1 to HP. In the lens region LA, the linear images A1, B1, ..., H1, etc. to be arranged in the lens position, which is the same as the lens orthogonal direction LX of N images to be changed, are arranged in the order that they are changed in the lens orthogonal direction LX.

The lens region LA as shown in FIG. 7 is a region having a width that is equivalent to the lens width facing the bottom surface of the lens 53. In each lens region LA, eight linear images A1, B1, C1, D1, E1, F1, G1, H1 are arranged in each division region that was divided into N in each lens region LA in the lens orthogonal direction LX. As shown in FIG. 7, a direction (right and left direction in FIG. 7) that the linear images Ai, Bi, ..., Hi (i=1, 2, 3, ..., P) are arranged is an arrangement direction of linear images. This arrangement direction is equivalent to the lens orthogonal direction LX. Also, the longitudinal direction of the linear image (sheet surface orthogonal direction in FIG. 7) is equivalent to the lens longitudinal direction LY. Therefore, in the description below, there is a case that the arrangement direction of the linear images is called as "arrangement direction LX", and the longitudinal direction of the linear image is called as "longitudinal direction LY".

In FIG. 7, when viewing from the angle obliquely upward right in a sight line K1, the linear images C1, C2, ..., CP are viewed through each lens 53, and the image C can be viewed as a whole. Further, in FIG. 7, when viewing from the angle obliquely upward left in a sight line K2, the linear images E1, E2, ..., EP are viewed through each lens 53, and the image E is viewed as a whole. The viewed image is changed in the order of images A, B, C, ..., H by changing such viewing angle. FIG. 7 shows the example that the three-dimensional image is change images, but the three-dimensional image may be a stereoscopic image. In the stereoscopic image, P division compression images that the image for left eye, which is divided into the same number as the number of P lenses in the lens orthogonal direction LX and compressed to 1/N times (e.g., N=2), and the image for right eye, which is divided into the same number as the number of P lenses in the lens orthogonal direction and compressed to 1/N times, are respectively and alternately arranged in the lens orthogonal direction LX.

The three-dimensional image 56 shown in FIGS. 8A and 8B is drawn by dots in a plurality of dot sizes (three kinds) of, for example, a large dot LD, a middle dot MD, and a small dot SD as shown in FIG. 8B. For example, as the dot size is larger, the ink is easily bled. Also, in the ink-jet recording method, there is a slight distance (gap) that the ink drop ejected from the nozzle of the print head 48 is landed to the sheet 50 so that in comparison with other record methods, it easily varies a dot position. Further, a part where the ink of the large dot LD was landed is easily bled. Due to these causes, the widths of the linear images A1 to H1, etc. are easily varied as shown in FIG. 8A. In this case, when the linear images C1, C2, etc. are viewed from the angle obliquely upward right in the sight line K1, the end parts BE, DE of the adjacent linear images B1, D1, B2, D2, etc. are viewed. This is one of the causes that reduces the image quality when the three-dimensional image 56 is viewed through the lens layer 52.

Further, the resolution of the lens orthogonal direction LX is dependent on the width of the lens 53 that is sufficiently wider than the dot diameter so that the resolution of the image when the three-dimensional image 56 is viewed through the lens layer 52 is relatively rough in the lens orthogonal direction LX. This point is also one of the causes that the user feels that the image quality of the three-dimensional image sheet 55 is low.

The size of dots used for printing is changed in response to the print image quality mode, and in the present embodiment, as an example, the large dot LD is only used in the low image quality print mode, and the three kinds of large, middle, and small dots LD, MD, SD are used in the middle image quality print mode, and two kinds of small and medium size dots MD, SD are used in the high image quality print mode. Needless to say, in the high image quality mode, when the use rate is changed lower than the middle image quality mode, the large dot LD may be used.

According to the aforementioned reasons, etc., for example, even though the user instructs printing in confirmation of the three-dimensional image in preview, the image quality of the actual printed three-dimensional image 56 greatly differs from the image in preview. Thus, in the present embodiment, the printed three-dimensional image 56 imitates as a real viewing image when viewing through the lens layer 52 so that the image (deterioration image) obtained by applying a deterioration processing to the image is previewed. Such preview processing will be described in detail later.

In the present embodiment, the functional parts configuring by software that execute the program PR by the CPU 65 is configured. The computer 61 is provided with a determination section that determines the print image quality mode, a deterioration processing section that applies a deterioration processing to an image in response to the print image quality mode, and a display processing section that previews the three-dimensional image after the image deterioration in the display section 21. Also, in a case that there is a structure that the CPU 75 in the printer 40 executes the program PR, the computer 71 is provided with, in the same manner, the determination section, the deterioration processing section and the display processing section as the functional parts configured by the software. In addition, in a case that there is a structure that the computer in the server 30 executes the program PR, the computer is provided with, in the same manner, the determination section, the deterioration processing section, and the display processing section.

FIGS. 9A-9C explain a deterioration processing that is applied to an image configuring the three-dimensional image (e.g., change images). The deterioration processing is different in response to the print image quality mode. A plurality of image data (see FIGS. 9A-9C), which is a plurality of images configuring the three-dimensional image and is used for preview of virtual image when the three-dimensional image is viewed through the lens layer 52, other than the print image data used to print the three-dimensional image is stored in the nonvolatile memory 68. The plurality of image data used for preview corresponds to original images A to H used for a formation of linear images A1 to H1 in the three-dimensional image, and is configured by image data of display color system (e.g., RGB color system) having, for example, resolution for display. A deterioration processing of a main image MG that is an object to be displayed in the display section 21 by using the plurality of image data is performed.

In the deterioration processing of the present embodiment, the main image is deteriorated by composing the main image of an object to be previewed in the display section 21, and the M images before and after (M represents natural number that satisfies 1≤M<N/2) of the main image in the order that they are changed. In FIGS. 9A-9C, the deterioration processing will be explained as an example of M=1. In the deterioration processing, a deterioration degree of the image is changed in response to the print image quality mode. That is, as the image quality of the print image determined by the print image quality mode is high image quality, the composite ratio of the M images before and after that are composed with the main image MG reduces. The composite ratio of the present embodiment is determined as opacity of the semi-transmissive processing that is applied to the M images before and after. That is, as the image quality of the print image determined by the print image quality mode is high image quality, the opacity of the semi-transmissive processing that is applied to the M images before and after that are composed with the main image MG reduces.

As shown in FIG. 9A, in the high image quality mode, as an example, the main image MG is 80% and the images BG, AG before and after it are respectively 10% so that they are composed in this ratio. This image composition is performed after the semi-transmissive processing was preliminary applied to each image that is composed. For example, the main image MG is the opacity of 100%, and the images BG, AG before and after are the opacity of 10% (transparency 90%).

Further, as shown in FIG. 9B, in the middle image quality mode, as an example, the main image MG is 70%, and the images BG, AG before and after it are respectively 15%, and they are composed in this ratio. In this image composition, for example, the main image MG is the opacity of 100%, and the images BG, AG before and after are the opacity of 15% (transparency 85%).

In addition, as shown in FIG. 9C, in the low image quality mode, as an example, the main image MG is 60%, and the images BG, AG before and after it are respectively 20%, and they are composed in this ratio. In this image composition, in the condition that the semi-transmissive processing is preliminary applied to each image that is composed, for example, the main image MG is the opacity of 100%, and the images BG, AG before and after are the opacity of 20% (transparency 80%). In the N images, when an object 01 in the first image (e.g., a car in FIGS. 9A-9C), an object 02 in the second image, and an object 03 in the third image sequentially change the viewing angle of the three-dimensional image sheet 55, the change images that move from the left side to the right side are configured in this order.

Further, in the deterioration processing of the present embodiment, for each image before composing, in addition to the semi-transmissive processing, a blurring processing is applied. The printer 40 performs printing in the ink-jet recording method so that the print resolution is relatively low in comparison with other commercial printers (e.g., offset printer, etc.) and the dot impact position accuracy is relatively low and the landed ink is also easily bled. For example, the low dot impact position accuracy or the bleeding of the ink causes that when the dots supposed to be in the next linear image enters a region of the linear image for observation target, the adjacent image is thinly observed. Further, as the print resolution is higher, the image when the three-dimensional image is viewed through the lenses 53 is clearly observed, but the three-dimensional image 56 drawn by the relatively low print resolution dots is relatively blurred in the observation.

In the present embodiment, the image in a condition that other images BG, AB are thinly observed when the main image MG of the three-dimensional image 56 drawn by the ink-jet recording method through the lens layer 52 is presented by composing the images BG, AB before and after, which were applied by the semi-transmissive processing, to the main image MG. The image in a condition of blurring is presented by applying the blurring processing to each of the images MG, BG, AG before the composition.

In FIGS. 9A-9C, the deterioration processing is applied to the images BG, AG, which are one image before and after the main image, to the main image MG, but the deterioration processing may be applied to the M images before and after (M 2). In this case, the semi-transmissive processing applied to the M images before and after the main image MG is performed by increasing transparency of the images more positioned away from the main image MG in the order of changes. In other words, in the semi-transmissive processing applied to other M images before and after the main image MG, as the disparity with respect to the main image MG increases, the transparency increases when the semi-transmissive processing is applied. That is, as the image is more positioned away from the main image MG, the image is thinly observed. Further, the blurring processing applied to the main image MG and the M images before and after it, which are more than or equal to two images used for generating the deterioration image, increases the degree of blurring of the images as it is more positioned away from the main image MG. That is, as the image is more positioned away from the main image MG, the blurry image is observed.

Further, as shown in FIG. 8A, in a case that variation in the dot impact position or the ink that is bled so that the end parts BE, DE of the adjacent linear images B1, D1, B2, D2 are protruded to the regions of the linear images C1, C2 of the main image, when the image C is viewed through the lens layer 52, the end parts BE, DE of the adjacent linear images B1, D1, etc., which are not supposed to be seen, are viewed. In this case, for example, when the image C is the main image MG, the semi-transmissive processing is applied to the entire adjacent images B, D (the images AG, BG before and after it in FIGS. 9A-9C), and it is composed with the main image MG. However, it is preferable that the semi-transmissive processing is only applied to the parts corresponding to the end parts BE, DE (end parts that are close to the linear images C1, C2 of the main image C) of the adjacent linear images B1, D1, etc. among the images B, D (the images AG, BG before and after it in FIGS. 9A-9C), and it is composed with the main image MG. When the M images before and after (M≥2) are used to be composed with the main image MG, among the M images, as the image is more positioned away from the main image MG in the order of changes, the transparency of the semi-transmissive processing applied to the part corresponding to the end part of the linear image increases. That is, as the disparity with respect to the main image MG increases, the transparency of the semi-transmissive processing to be applied to the part corresponding to the end part of the linear image of other M images before and after increases.

Further, as shown in FIG. 8B, the three-dimensional image 56 is drawn by the large, middle, small dots LD, MS, SD, and among them, as the dot size is larger, the ink is easily bled. For example, when the image C is observed through the lens layer 52, the part of the adjacent images B, D drawn by the large dot LD is easily viewed. Therefore, it is preferable that the semi-transmissive processing is applied to only the large dot part within the adjacent image, and it is composed to the main image MG. Here, in a case that the image data GD for preview is, for example, the RGB image data, when an average value that a total value of each value of the RGB three colors of pixels is divided by the number of the colors "3" is less than or equal to the threshold value (e.g., 50%) (the average value of each value of the CMY three colors in the CMYK list color system corresponds to more than or equal to 50%), it can determine as the large dot. Specifically, in a case that each value of RGB is 256 gradations, when the average value of each value of RGB is less than or equal to 128, it determines as the large dot so that the semi-transmissive processing is applied to only the pixels that satisfy this condition. In this case, the middle dot and the small dot are determined as the transparency of 100% so that the semi-transmissive processing is not applied. The threshold that determines the large dot can be appropriately changed, and for example, 30% or 70% may be employed. Further, the color conversion to the CMYK list color system and the halftone processing may be applied to the RGB image data, the CMYK image data representing by the actual large, middle, and small dots is generated, or the simulation calculation is performed and the semi-transmissive processing may be applied to only the pixels within the range that becomes the large dot in the RGB image data.

Needless to say, the semi-transmissive processing may be applied to the dots in other sizes other than the large dot which is the largest size. For example, the semi-transmissive processing may be applied to only the two kinds of large and middle size dots. In this case, it may be effective when the same transparency of the semi-transmissive processing is applied to the two kinds of large and middle size dots, but when the transparency is set differently, it is more effective. For example, there is a structure that the semi-transmissive processing is applied to the middle dot, and the semi-transmissive processing is not applied to the small dot (transparency 100%), and the transparency of the semi-transmissive processing applied to the large dot is lower than the transparency of the semi-transmissive processing applied to the middle dot. In addition, there may be a structure that the semi-transmissive processing is applied to the dots in all sizes, and as the size of the dot is larger, the transparency of the semi-transmissive processing applied to the dots becomes lower. Such that, it is preferable that the transparency of the semi-transmissive processing applied to the largest dot is lower than other parts (dots in other sizes). Also, other images when the transparency of the semi-transmissive processing applied to the large dot is lower than other parts is not limited to the images adjacent to the main image MG, and it may be applied to other M images before and after the main image MG. In this case, as other images that the disparity with respect to the main image MG increases, it is preferable that the transparency of the semi-transmissive processing applied to the dots increases. Further, the kinds of dot size are not limited to three kinds of large, middle, and small, and it may be two kinds of large and small. In addition, the same semi-transmissive processing method may be applied to the dots in four kinds or five kinds of dot sizes.

Further, when the three-dimensional image 56 is viewed through the lens layer 52, the easiness of view of the adjacent image is different depending on the color of image. The pixels that are light color in the adjacent image are relatively viewed hard, but the pixels that are dark color are relatively viewed easy, and in the pixels that are intermediate color, the easiness of view for the pixels is intermediate between the light color and the dark color. Therefore, it is preferable that the semi-transmissive processing is applied to only the part of dark pixels that exceeds the threshold value within the adjacent image, and it is composed with the main image MG. In a case that the image data GD for preview is, for example, the RGB image data, by using the color calculated value that is calculated from each value of the RGB three colors of the pixels, the dark color pixels that the color calculated value exceeds the threshold value are determined, and the semi-transmissive processing may be applied to only the dark color pixels. Further, whether the pixels are the dark color, the intermediate color, or the light color, it is determined by each value of the RGB three colors of the pixels, and the semi-transmissive processing may be applied to only the dark color pixels based on the determination result. As the pixels are darker colors, the semi-transmissive processing is applied in the lower transparency depending on the dark color, the intermediate color, or the light color, and the semi-transmissive processing is applied by respectively changing the transparency to each pixel of dark color, intermediate color, and light color, and it may be composed with the main image. In a case that the M images before and after (M≥2) are used for being composed with the main image MG, among the M images before and after, as the image is more positioned away from the main image MG, the transparency of the semi-transmissive processing applied to the dark color images, which exceeds the threshold value, increases.

In the present embodiment, at least one of the aforementioned conditions is employed, and the semi-transmissive processing is performed in the images composed with the main image MG or the pixels, but it is preferable that a plurality of conditions are preferably combined. It is more desirable that the semi-transmissive processing is performed in the images composed with the main image MG by specifically, employing all conditions.

FIG. 10 shows an example of a preview screen. The preview screen 81 is displayed in the display section 21 of the mobile terminal 20 that has a host function which transmits the print data PD to the printer 40, or it is displayed in the display section 44 of the printer 40. As shown in FIG. 10, the preview screen 81 is provided with a screen 82 that displays a deterioration image that imitates an image when the three-dimensional image 56 is viewed through the lens layer 52. Further, the preview screen 81 is provided with a reproduction operating section 83 that operates to reproduce N images, which are changed when viewing from different viewing angles, in the screen 82, a frame advance operating section 84 that advances one image, which is displayed in the screen 82, to the next frame, and a frame back operating section 85 that operates back to the previous frame. The user operates the operating sections 83 to 85 in a touch panel of the display sections 21, 44 by the finger.

Figure 10A:
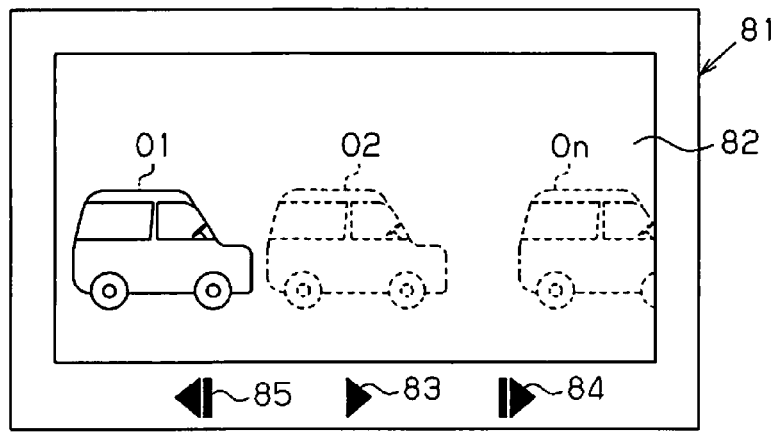
FIG. 10A is a screen diagram showing display contents of a preview screen.
Figure 10B:
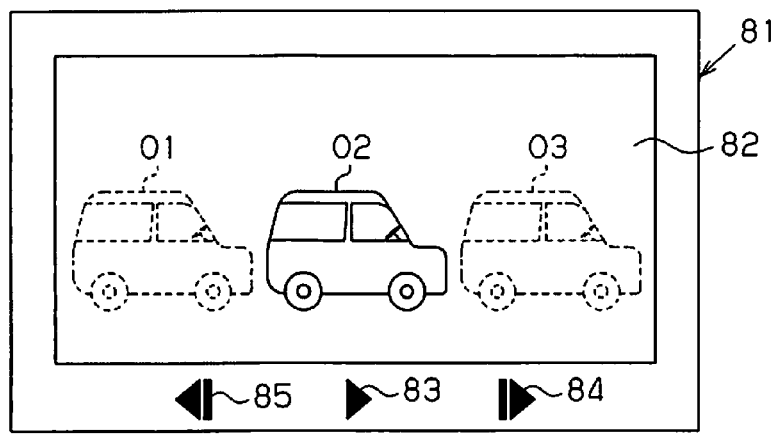
FIG. 10B is a screen diagram showing display contents of the preview screen.
Figure 10C:
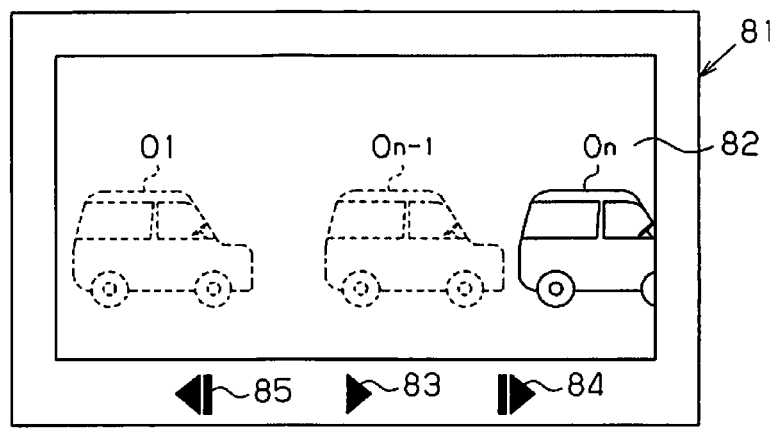
FIG. 10C is a screen diagram showing display contents of the preview screen.

As shown in FIGS. 10A-C when the frame advance operating section 84 is operated, the computers 61, 71 execute the program PR, and the deterioration processing that deteriorates the main image MG is performed by using the M images (e.g., M=1 in FIGS. 10A-C) before and after, and the composite image (deterioration image) after the deterioration processing is displayed in the screen 82.

As shown in FIG. 10A, when the first image is the main image MG, the object 01 in the first image is thickly displayed in a condition of blurring slightly, and the object 02 in the second image AG is thinly displayed in a condition of blurring, and the object 0n in the N-th image BG is thinly displayed in a condition of blurring. This is that when the first image A is the main image MG, it assumes in a case that the linear images H0, H1, H2, etc., which are positioned adjacent to the linear images A1, A2, A3, etc. through the border of the lens region LA as shown in FIGS. 8A and 8B, are viewed through the lenses 53, and the semi-transmissive processing is also applied to the N-th image H, and it is composed with the main image MG. Therefore, in the preview screen 81, the object 0n in the N-th image is thinly composed and displayed.

That is, the semi-transmissive processing is also applied to the image which is a reverse viewing, and it is composed with the main image.

Next, as shown in FIG. 10B, when the second image is the main image MG, the deterioration processing is applied to the main image MG by using the first image BG and the third image AG, and the composite image (deterioration image) obtained in the deterioration processing is displayed in the screen 82. In the same drawing of FIG. 10B, the object 02 in the second image is thickly displayed in a condition of blurring slightly, and the object 01 in the first mage and the object 03 in the third image are thinly displayed in a condition of blurring.

Hereinafter, in the same manner, the third, the fourth, ..., N-th images are the main image MG in the order, and the composite image obtained by applying the deterioration processing to the main image MG by using the images BG, AG respectively positioned before and after it in circumstances of moment is displayed in the screen 82. As shown in FIG. 10C, when the N-th image is the main image MG, the deterioration processing is applied to the main image MG by using the N−1th image BC, which is positioned before it, and the first image AG, which is positioned after it, and the composite image obtained in the deterioration processing is displayed in the screen 82. As shown in the same drawing of FIG. 10C, the object 0n of the N-th image is thickly displayed in a condition of blurring slightly, and the object 0n−1 in the N−1th image and the object 01 in the first image are thinly displayed in a condition of blurring. As described above, the semi-transmissive processing is also applied to the first image which is a reverse viewing, and it is composed with the main image MG.

The frame advance operating section 84 is operated in the same manner as the aforementioned description, and the plurality of images (8 images in the present example) configuring the three-dimensional image 56 can be checked one by one by advancing frames of the images one-by-one in the preview screen 81. Further, by operating the reproduction operating section 83, a condition of changing a plurality of images observed when the viewing angle of the three-dimensional image sheet 55 is gradually changed is displayed in the animation. As a result that the three-dimensional image is preliminary checked in the frame advance of these images and the animation, if there is no problem with the image quality, the user instructs the printing of the three-dimensional image.

Figure 11:
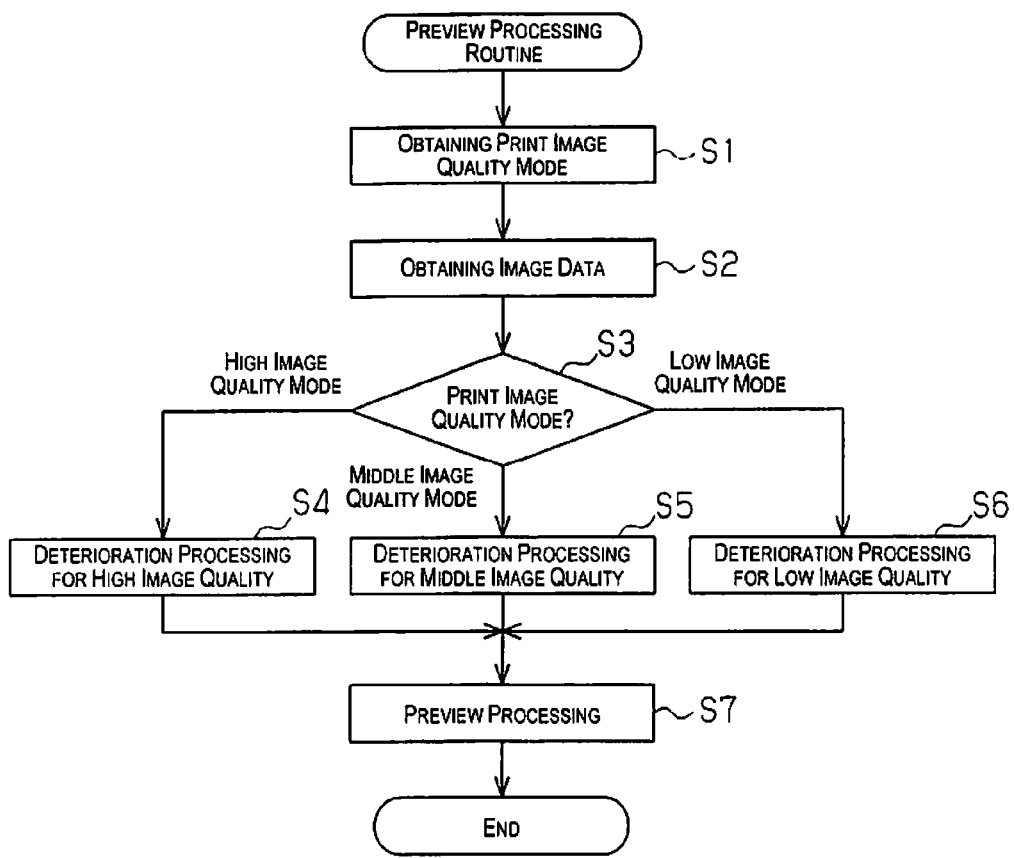
FIG. 11 is a flowchart showing a preview processing routine.

Next, the operation of the mobile terminal 20 having the computer 61 that executes the program PR will be explained in reference to FIG. 11.

In the nonvolatile memory 68 of the mobile terminal 20, the program PR including the contents preliminary downloaded from the server 30, and the image data GD are stored. The user operates the mobile terminal 20 to select the three-dimensional image data of the print target and set the print conditions before instructing the execution of the printing. In the print conditions include the print image quality mode (print mode), the print color (color/Gray scale), the medium type (normal paper, photograph, postcard, lens sheet, etc.), and the medium size (A4 size, B5 size, postcard, L-size, etc.), etc. The user selects one of "high image quality mode", "middle image quality mode", and "low image quality mode" as the print image quality mode. Also, in the machine that has only two kinds of the print image quality mode, one of "high image quality mode" and "low image quality mode" is selected. After that, the user operates to instruct the execution of printing to the mobile terminal 20. When the CPU 65 receives the predetermined operation, the program PR shown in FIG. 11 read out from the Nonvolatile memory 68 is executed, and the preview processing is performed. Hereinafter, the preview processing routine will be explained in accordance with FIG. 11.

First, in Step S1, the print image quality mode is obtained.

In Step S2, the image data is obtained. That is, the CPU 65 reads out the image data GD for preview corresponding to the three-dimensional image data specified by the user from the nonvolatile memory 68. In the present example, the image data GD is the image data of the N images configuring the three-dimensional image that is the change images or the stereoscopic image. Hereinafter, it will be explained in an example of the change images.

In Step S3, the print image quality mode is determined. When the print image quality mode is the high image quality mode, it proceeds to Step S4, and when it is the middle image quality mode, it proceeds to Step S5, and when it is the low image quality mode, it proceeds to Step S6.

In Step S4, the deterioration processing for high image quality is performed. That is, the CPU 65 composes the M images before and after (surrounding images) with respect to the main image MG in the set composite ratio of Ahj (%) (j=1, 2, ..., M), and the main image MG becomes blurring as an imitation of the real viewing image when the three-dimensional image 56 is viewed through the lens layer 52. Here, Ahj indicates the composite ratio (%) when the images from the main image MG to j-th image are composed. In the present example, it is, for example, M=1. That is, one image before and after with respect to the main image MG is composed in the composite ratio Ah1(%). The composite ratio Alj for high image quality is 10% as an example shown in FIG. 9A.

The deterioration processing includes the semi-transmissive processing and the blurring processing. In the semi-transmissive processing, the semi-transmissive processing is applied to the main image MG and the M surrounding images before and after. In the present example, the semi-transmissive processing is applied to the main image MG in the opacity of 100% (transparency 0%) and to the M surrounding images before and after in the opacity of Ahj %. That is, the semi-transmissive processing is not applied to the main image MG. Here, the image data of the present example has the color information of RGB and α value (alpha value) that represents transparency in each pixel. The composite ratio indicates, for example, α value×100%. Therefore, in the semi-transmissive processing, a value of the main image MG keeps "1", and a value of the M surrounding images before and after is Ahj/100. That is, in the present example, the opacity in the main image MG is 100%, and it is set in a condition that as the M surrounding images before and after are more positioned away from the main image MG, the transparency increases. When the surround images in the predetermined opacity (e.g., composite ratio of 10%) that the semi-transmissive processing was applied is composed with the main image MG in the opacity of 100%, the main image MG becomes thin by this composition, and as a result, the composite ratio of the main image MG becomes the value as shown in FIGS. 9A-9C (e.g., 80%).

Also, the semi-transmissive processing may be applied by setting the value less than 100% of the opacity in the main image MG.

As the blurring processing, a Gaussian blurring processing is used as an example. Needless to say, well-known other blurring processes may be used. After the semi-transmissive processing, the blurring processing is performed to the main image MG and the M surrounding images before and after, which are the composition object. After the semi-transmissive processing and the blurring processing are respectively applied, the image composition processing to compose the main image MG and the M surrounding images before and after is performed. These processes are performed for the N images by sequentially changing the main image MG. Here, when the first and N-th images are defined as the main image MG, there is a surrounding image in only one side of the images before and after it. When the first image is defined as the main image MG, the N-th image is employed as a previous image of the surrounding image, and when the N-th image is defined as the main image MG, the first image is employed as a next image of the surrounding image.

Here, the semi-transmissive processing applied to the surrounding images composing with the main image MG may be applied to the entire surrounding image, but at least one of the aforementioned conditions may be employed and it is preferably applied to a part of the surrounding images. That is, at least one of a condition that the semi-transmissive processing is applied to only the end parts (e.g., the end parts BE, DE in FIGS. 8A and 8B), which are in the linear image adjacent to the linear image of the main image MG and in the linear image side of the main image MG, and they are composed, a condition that the semi-transmissive processing is applied to only a part of the pixels, which can be the large dot, and they are composed, and a condition that the semi-transmissive processing is applied to only the dark color pixels, which exceeds the threshold value, and they are composed is employed. In this case, among these three conditions, only one condition may be employed, only two conditions may be employed, or all conditions may be employed. For example, when all conditions are employed, the semi-transmissive processing is applied to only the dark color pixels, which exceeds the threshold value and satisfies the condition of the large dot, among the pixels within the area of the end parts of the adjacent linear image, and it is composed with the main image MG.

In Step S5, the deterioration processing for middle image quality is performed. The M surrounding images before and after with respect to the main image MG are composed in the set composite ratio Amj (j=1, 2, . . . , M)(%). In the present example, for example, it is M=1. That is, one image before and after BG, AG with respect to the main image MG are composed in the set composite ratio Am1(%). The composite ratio for middle image quality Amj is set to be 15% as an example as shown in FIG. 9B. This deterioration processing is processed in the same manner as the deterioration processing for high image quality so that the composite ratio Aj is only different.

In Step S6, the deterioration processing for low image quality is performed. The M surrounding images before and after with respect to the main image MG are composed in the set composite ratio Alj (j=1, 2, . . . , M)(%). In the present example, for example, it is M=1. That is, one image before and after with respect to the main image MG are composed in the composite ratio Al1(%). The composite ratio Alj for low image quality is 20% as an example as shown in FIG. 9C. The deterioration processing is processed in the same manner as the deterioration processing for high image quality so that the composite ratio Aj is only different. As the mode is lower print image quality, the composite ratios Ahj, Amj, Alj (%) are set in high value, and an appropriate value can be set in the range that satisfies the relationship of Ahj<Amj<Alj.

In Step S7, the preview processing is performed. That is, the image after the deterioration processing is displayed in the display section 21. For example, in the display section 21 of the mobile terminal 20, the preview screen 81 as shown in FIGS. 10A-C is displayed. In the preview screen 81, first, one image (see FIG. 10A) among the N images configuring the three-dimensional image is displayed. The user can check the images one-by-one by operating the frame advance operating section 84. Further, by operating the reproduction operating section 83, the image displayed on the screen 82 is sequentially switched in a predetermined time interval, and the images observed when the viewing angle of the three-dimensional image sheet 55 is sequentially changed in one direction are displayed in animation. The user selects at least one of the frame advance and the frame back in the preview screen 81 and confirms the images, and if there is no problem with the image quality, the execution of printing is instructed by operating the mobile terminal 20.

The CPU 65 of the mobile terminal 20 transmits the print data PD to the printer 40. When the print data PD transmitted by the mobile terminal 20 is, for example, the RGB image data, the computer 71 in the printer 40 converts the received print data PD to the print data of CMYK list color system, and drives the print engine 72 based on the print data. By driving the print engine 72, while the lens sheet 50 is intermittently conveyed by the conveyance roller pair 46, the three-dimensional image 56 is printed on the printing surface of the lens sheet 50 by landing the ink drops ejected from the nozzles of the print head 48 onto the printing surface. When the provided three-dimensional image sheet 55 is viewed from the lens 53 side, the three-dimensional image 56 viewed through the lens layer 52 is similar to the image quality in the preview image so that the user will satisfy the image quality as assumed. If the capacity of the memory of the mobile terminal 20 has space, it may be a configuration that the image data is converted to the print data by the printer driver on the mobile terminal 20 side and the print data PD is transmitted from the mobile terminal 20 to the printer 40.

According to the present embodiment as described above, the following effects can be obtained.

(1) The program PR that executes the computers 61, 71 includes the image deterioration step (S4 to S6) that applies the deterioration processing to at least one image in the plurality of images so as to approximate to the image when the three-dimensional image 56 is viewed through the lens layer 52, and the display step that displays the deterioration image obtained in the image deterioration step in the display sections 21, 44. Accordingly, the virtual image (deterioration image) that approximates to the image when the three-dimensional image 56 is viewed through the lens layer 52 can be displayed in the display sections 21, 44.

(2) In the image deterioration step (S4 to S6), the deterioration processing, which approximates to the image when viewing through the lens layer 52, is applied to the print image printed in the predetermined print resolution that is lower than the resolution of the display system for displaying the three-dimensional image. Therefore, the three-dimensional image 56 printed in the printer 40 can be confirmed by the imitated image that is the image when viewing through the lens layer 52.

(3) The deterioration processing includes the semi-transmissive processing applied to at least other images BG, AG in the main image MG used for generating the deterioration image in the plurality of images and other images BG, AG, and in the image deterioration step (S4 to S6), more than or equal to two images (images BG, MG, AG) including the images (BG, AG) that the deterioration processing including the semi-transmissive processing was applied are composed and the deterioration image is generated. Therefore, the virtual image that other images BG, AG are thinly viewed with the main image MG when the three-dimensional image 56 is viewed through the lens layer 52 can be displayed in the display sections 21, 44.

(4) In the image deterioration step (S4 to S6), the semi-transmissive processing is applied to at least the M surrounding images before and after (M represents natural number) with respect to the main image MG in more than or equal to two images used for generating a deterioration image, and a blurring processing is applied to more than or equal to the two images. After the deterioration processing including these processes was applied, the main image and the M images before and after are composed and the deterioration image is generated. Therefore, the virtual image that the M images BG, AG before and after are thinly viewed with the main image MG when the three-dimensional image is viewed through the lens layer 52 can be displayed in the display sections 21, 44.

(5) The virtual three-dimensional image is the change images that change the plurality of images depending on different viewing angles through the lens layer 52, and in the image deterioration step (S4 to S6), as the disparity with respect to the main image MG increases, the transparency of the M surrounding images before and after increases. As the disparity of the main image MG increases, the M images before and after that are gradually thinning can be displayed.

(6) In the display step (S7), the deterioration image that imitates the image when the three-dimensional image 56 is viewed through the lens layer 52 is previewed before the printer 40 prints the three-dimensional image. Therefore, the image quality of the three-dimensional image 56 is confirmed in the preview in advance, and the printing of the three-dimensional image can be executed. Thus, the printing error of the three-dimensional image can be avoided.

(7) In the image deterioration step (S4 to S6), when the print mode that the three-dimensional image is printed in the printer 40 is the high image quality, the deterioration degree for the image by the deterioration processing is lower than the low image quality mode. Therefore, the image when the three-dimensional image is viewed through the lens 53 in the display sections 21, 44 in the deterioration degree in response to the print mode can be displayed in the display sections 21, 44.

(8) In the image deterioration step (S4 to S6), the deterioration processing is applied to the pixels in the M images before and after that the pixel value exceeds the threshold value in the dark side when the M images before and after are color-converted to the print color system (CMYK list color system), and the pixels after the deterioration processing was applied is composed with the main image MG. For example, in the pixels that a plurality of color values (e.g. RGB value) of the display color system is small, the density is high in CMYK at the time of printing so that the ink drop increases when it is converted to the print data of more than or equal to three gradations (e.g., four gradations). The large dot formed by such increased ink drop is easily bled to the area of the adjacent linear image, and the image in which the part of the bled adjacent image is thinly viewed in the main image MG can be displayed in the display sections 21, 44.

(9) In the image deterioration step (S4 to S6), in the M images before and after, the semi-transmissive processing is applied to the parts corresponding to the end parts, which are in the linear image arranged adjacent to the linear image of the main image and in the linear image side of the main image. The parts corresponding to the end parts in the M images before and after are composed to the main image after the deterioration processing. Therefore, when the border part of the linear image is protruded to the area of the linear image, the protruded part that is supposed to be not seen is viewed through the lens layer 52 so that the image that the end part in the linear image side of the main image of the adjacent linear image, in which the adjacent linear image is protruded to the area of the linear image of the main image, is thinly viewed can be displayed in the display sections 21, 44.

(10) In the image deterioration step (S4 to S6), in the linear images in the plurality of images configuring the change images, when the image that the linear image is arranged in the end of the lens 53 is defined as the main image, the deterioration processing is applied to the image corresponding to the adjacent linear image (division compression image) arranged in the end part of the adjacent side in the lens 53, which is positioned adjacent to the lens 53. The image after the deterioration processing is composed to the main image MG.

Thus, the deterioration processing is also applied to the image, which becomes reverse viewing, and it is composed to the main image MG so that the virtual image that the image, which becomes reverse viewing, is thinly viewed can be displayed in the display sections 21, 44.

(11) In the image deterioration processing, the semi-transmissive processing that reduces the transparency is applied to the part which becomes the largest dot in the M images before and after. Therefore, the largest dot part is relatively composed higher density than other part in the main image so that the virtual image that the part having the large dots is thinly viewed when the three-dimensional image is viewed through the lens 53 can be displayed in the display sections 21, 44.

Second Embodiment

The second embodiment will be described in reference to FIGS. 12A-C and FIG. 13.

A three-dimensional image of the present embodiment is a stereoscopic image that is capable of stereoscopically viewing through the lens layer by using disparity of left and right eyes, and has an image for left eye and an image for right eye as a plurality of images configuring the three-dimensional image. To provide the stereoscopic image, for example, the user takes two images having disparity by a camera, and determines whether or not these two images viewed from different angles are appropriate for using as the three-dimensional image.

Figure 12A:
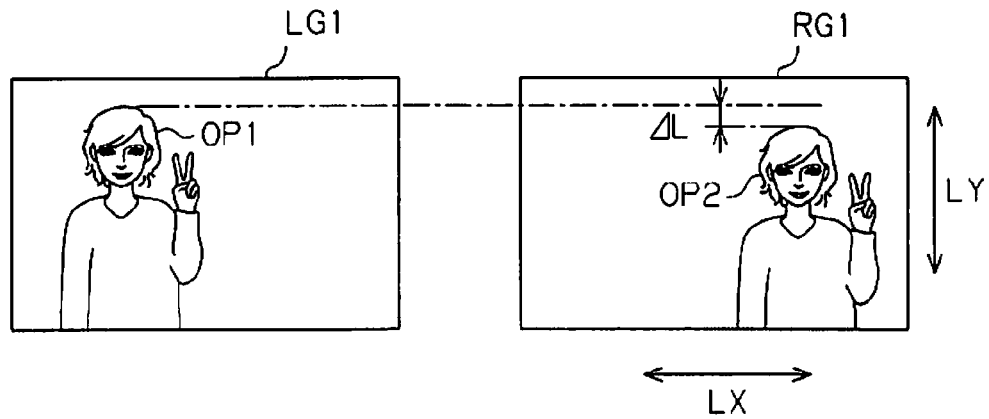
FIG. 12A is an explanatory diagram explaining an image processing of a second embodiment.

As shown in FIG. 12A, the height positions of an object OP1 (object) in an image for left eye LG1 and an object OP2 in an image for right eye RG1 are calculated, and both height positions are compared and a displacement amount $\Delta L$ in the height direction (lens longitudinal direction LY) is detected. For example, the computers 61, 71 specify a position and a size of a person from a feature amount of a face of the person by the characteristic sampling method, and the height positions of the person are calculated based on the specific information. An example of the first stereoscopic object is configured by the object OP1 in the image for left eye LG1, and an example of the second stereoscopic object is configured by the object OP2 in the image for right eye RG1.

Figure 12B:
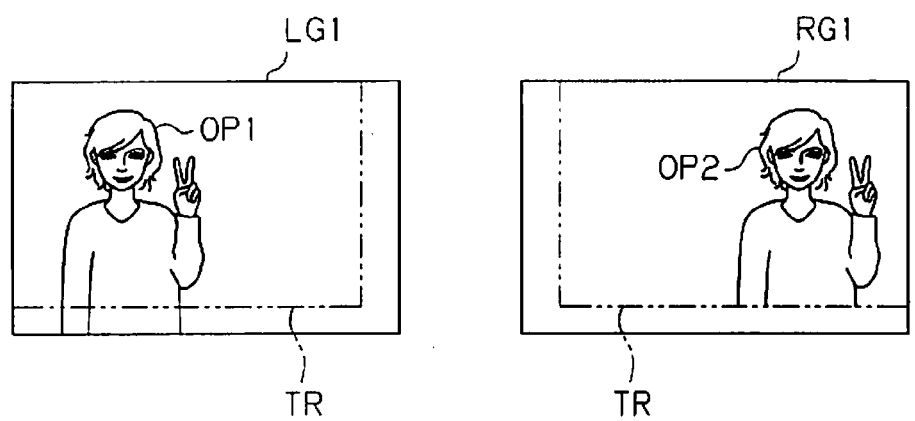
FIG. 12B is an explanatory diagram explaining the image processing of the second embodiment.

When the displacement amount $\Delta L$ in the height direction exceeds the predetermined threshold Lz, a displacement correction processing is performed in the height direction. The height of the person is matched with the person in the next image so as to correct the persons in the same height. At this point, as shown in FIG. 12B, by moving the person upward, a blank space is created in the opposite side of the moving direction. The rectangular region without the blank space is as a trimming region TR, and the image is cut by this trimming region TR. In the same manner, the trimming region TR is set in the left side image LG1, and the image is cut by the trimming region TR.

Figure 12C:
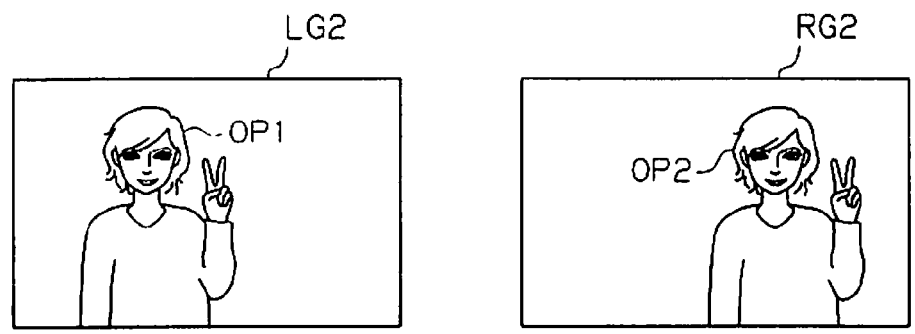
FIG. 12C is an explanatory diagram explaining the image processing of the second embodiment.

As shown in FIG. 12C, each of the images LG1, RG1 is expanded to the original size after the trimming. As a result, even though the images LG1, RG1 are displaced in the height direction, it can be corrected to be the images LG2, RG2 that is capable of generating the three-dimensional image by using the usable region TR. The three-dimensional image that was corrected and newly generated is previewed as the image when viewing through the lens.

Figure 13:
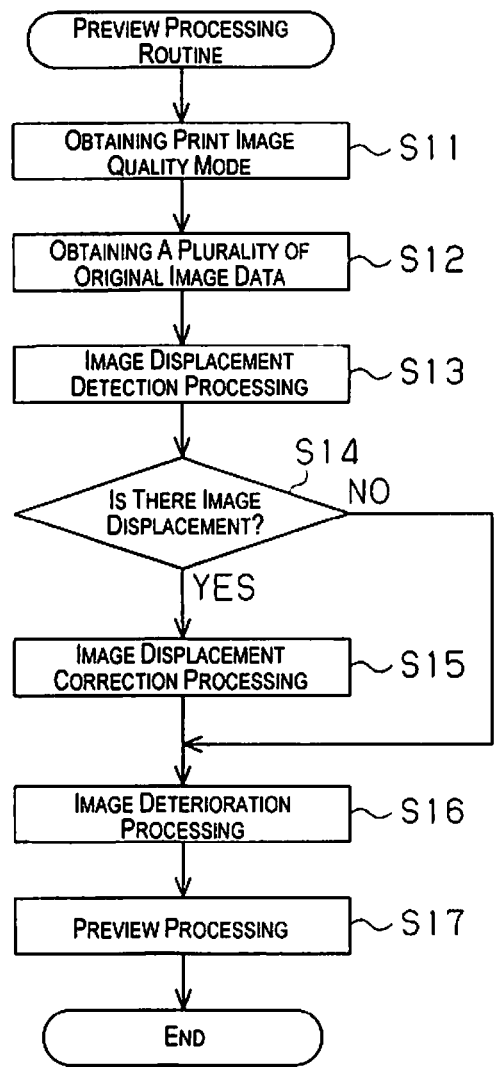
FIG. 13 is a flowchart showing a preview processing routine of the second embodiment.

FIG. 13 is a preview processing routine in the present embodiment. The CPU 65 performs the preview processing by executing the program PR.

First, in step S11, the print image mode is obtained.

In Step S12, a plurality of original image data is obtained. Here, the original image data means a plurality of images, which are desired to be used for the three-dimensional image, and they are taken by the user's camera. For example, when a stereoscopic image is provided, the images for left eye and the images for right eye are prepared, and they are preliminary stored in the nonvolatile memory 68. The plurality of stored images are read out and obtained from the nonvolatile memory 68.

In Step S13, an image displacement detection processing is performed. The image displacement detection processing is the process explained in reference to FIG. 12A, and the height direction displacement amount ΔL of the objects OP1, OP2 (target person) in the height direction (lens longitudinal direction LY) is calculated.

In Step S14, it determines whether or not there is an image displacement. That is, it determines whether or not the displacement amount ΔL exceeds the acceptable range. If there is an image displacement, it proceeds to Step S15, and if there is no image displacement, it proceeds to Step S16.

In Step S15, the image displacement correction is performed. One of the plurality of images LG1, RG1 is moved in the height direction for the obtained displacement amount ΔL until the displacement amount ΔL fits in the acceptable value range (see FIG. 12B). In addition, the part that is usable for the three-dimensional image is obtained as the trimming region TR. The obtained trimming region TR is expanded to the original image size and the plurality of images LG2, RG1 for the stereoscopic image as shown in FIG. 12C are generated.

Next, in Step S16, the image deterioration processing is performed. That is, the deterioration processing is applied to the plurality of images LG2, RG2. This deterioration processing is the process in the same manner as the deterioration processing in FIG. 11 in the first embodiment. That is, the deterioration processing is performed in the deterioration degree in response to the print image quality mode that is set at the time. Specifically, one of the display objects in the plurality of images LG2, RG2 is defined as a main image, and the semi-transmissive processing is applied to the M images before and after it, however if other image is only one, it is applied to this one image. The transmittancy of the semi-transmissive processing is set from the value determined by the print image quality mode at the time. A blurring processing is applied to the image after the semi-transmissive processing and the main image. In the blurring processing, the blurring degree is also set in response to the print image quality mode. By composing the main image and other images after the blurring processing, the deterioration image is generated.

In Step S17, the preview processing is performed. That is, the deterioration image is displayed in the screen 82 of the preview screen 81. For example, when the frame advance operating section 84 is operated in the preview screen 81, it is switched to the next image. At this point, the other image is defined as the main image and the deterioration processing (S16) is applied to it, and the generated deterioration image is displayed in the preview screen 81.

In the aforementioned example, the CPU 65 performs the image displacement detection processing, determines whether or not there is the image displacement, and performs the image displacement correction, but the user may perform at least one of these processes by operating the operating section by hand. For example, in FIG. 12A, when the user selects the position adjustment mode by operating the operating section, the CPU 65 that receives this operation performs the operation mode that can move at least one of the two images RG1, RG2 displayed in the display sections 21, 44 in at least the height direction. In this operation mode, by operating the operating section by the user, at least one of the two images RG1, RG2 is moved in at least height direction, and the position adjustment is performed until the displacement amount ΔL of both images is fit in the acceptable range (position adjustment step).

When the position adjustment is completed by the aforementioned manual operation, the user performs trimming by selecting the trimming region TR by the manual operation. Next, when the CPU 65 receives the selection of expansion based on an operation signal of the operating section operated by the user, it becomes an expandable condition, and for example, the user selects a top part of the trimming region TR and expands to a desired size by moving the top part in the selected condition. Further, a function that expands the trimming region TR to the image size of the original image which was trimmed is provided, and when it receives the selection of this function, the CPU 65 may perform the expansion processing of the trimming region TR and may expand the image of the trimming region TR to the image size of the original image which was trimmed.

Further, the user operates the operating section, and the trimming region TR is selected in one of the plurality of images LG1, RG1 configuring the three-dimensional image, e.g., the image RG1, (an example of specific image) (adjustment step). In this condition, when a predetermined instruction is given to the CPU 65, the CPU 65 specifies the relative position of the trimming region TR in the image LR1, and in the other image LG1, the trimming region TR in the same size may be automatically set to the inverted relative position in the right and left direction (lens orthogonal direction LX). That is, when the user manually selects the trimming region TR for one of the plurality of images LG1, RG1, it is reflected to the other images (reflecting step). Therefore, the user does not have to repeat the same operation to the number of images. Further, when the three-dimensional image is the change images as shown in FIGS. 9A-9C and FIGS. 10A-C, there are a plurality of images configuring it, and for example, the user operates the operating section in the preview screen 81 shown in FIGS. 10A-C to apply the correction (deletion, process, movement, etc.) to any one of the images (an example of the specific image) (adjustment step). When the user instructs to reflect the correction by operating the operating section, the CPU 65 performs the processing to reflect the correction to the plurality of other images (reflecting step).

According to the present embodiment as described above, the following effects can be obtained.

(12) The three-dimensional image is the stereoscopic image including the image for left eye LG1 and the image for right eye RG1. In the image deterioration step (S16), the deterioration processing is applied to at least the other image which is not the main image to be displayed in the display section 21, 44 in the image for left eye LG1 and the image for right eye RG1, and the deterioration image is generated by composing the other image after the deterioration processing and the main image.

By displaying the deterioration image in the display sections 21, 44 in the display step (S17), the image that is similar to the image when the stereoscopic image is viewed through the lens layer 52 can be displayed in the display sections 21, 44.

(13) The program PR is provided with the position adjustment step before the image deterioration step (S16) or after the display step. In the position adjustment step, when the displacement amount ΔL between the object OP1 (an example of the first stereoscopic object) included in the image for left eye LG1, and the object OP2 (an example of the second stereoscopic object) included in the image for right eye RG1 in the lens longitudinal direction LY exceeds the acceptable range, the object OP1 and the object OP2 are position-adjusted in the lens longitudinal direction LY until the displacement amount ΔL is fit in the acceptable range. Therefore, the image for left eye and the image for right eye capable of showing the stereoscopic view in the relative high quality when the three-dimensional image is viewed through the lens layer 52 can be obtained.

(14) The program PR further includes the trimming step that performs the trimming to remove the part where the three-dimensional image is not formed in the plurality of images after the position adjustment. Therefore, by using the image for left eye and the image for right eye after the trimming, the object can be stereoscopically viewed without the blank space when viewing through the lens layer 52.

(15) In the position adjustment step (S15), the position is manually adjusted based on the instruction from the operating section operated by the user. Therefore, by operating the operating section by the user, the height of the image for left eye LG1 and the image for right eye RG1 can be manually adjusted.

(16) In the position adjustment step (S13 to S15), the displacement amount ΔL in the height direction of the stereoscopic objects is calculated from the positions of the respective stereoscopic objects obtained by performing the characteristic extraction to the image for left eye LG1 and the image for right eye RG1, and when the displacement amount ΔL exceeds the acceptable range, the positions of the height direction of the stereoscopic objects are automatically adjusted until the displacement amount ΔL is fit in the acceptable range.

Therefore, the user does not have to take an image again or does not have to perform the manual adjustment.

(17) The program PR is provided with the adjustment step that adjusts a part of the specific image in the plurality of images configuring the three-dimensional image before the image deterioration step (S16) and after the display step (S17), and the reflecting step that reflects the adjustment result in the adjustment step to other images other than the specific image in the plurality of images. Therefore, when the specific image in a part of the plurality of images was adjusted, the adjustment result is reflected to other images other than the specific image. As a result, the necessary operations for the adjustment, which are performed by the user, are reduced.

(18) The printer 40 is provided with the nonvolatile memory 79 (an example of recording section) that stores the program PR, the computer 71 (specifically, CPU 75) that executes the program PR, and the display section 44 that displays the image generated by the computer 71. Therefore, the image that is similar to the image when the three-dimensional image is viewed through the lens layer 52 can be displayed in the display section 44 of the printer 40. Therefore, the image that is previewed in the display section 44, and the image when the three-dimensional image is viewed through the lens layer 52 that is actually printed in the printer 40 are similar in view of the image quality so that the satisfactory three-dimensional image can be printed. For example, it can avoid failing the printing of the three-dimensional image such that the image quality of the three-dimensional image, which is actually printed and viewed through the lens layer 52, is lower than the image quality in the preview.

The aforementioned embodiments may be modified to the following embodiments.

The deterioration processing may include at least one of the semi-transmissive processing and the blurring processing. Specifically, the semi-transmissive processing that the semi-transmissive is applied to the other image is preferably included, and the composition processing that the semi-transmitted other image is composed with the main image is preferably included. Further, to present the low resolution of the lens orthogonal direction LX that is dependent on the width of the lens 53, the processing that reduces the resolution of the lens orthogonal direction LX to the main image and the M images before and after may be applied, or non-invertible magnification/reduction processing may be applied to the three-dimensional image data in the lens orthogonal direction LX.

The M image before and after that are composed with the main image MG in which the semi-transmissive is applied are not limited to the adjacent image before and after (one before and one after), it may be two images before and after, three images before and after, or four images before and after. Further, the semi-transmissive may be applied to only the M image before or only the M image after with respect to the main image MG and they may be composed. In this case, as the images are farther from the main image, the opacity is preferably lower. Also, it may be N image before and M image after (However, it is N≠M).

The plurality of images (image data) obtained by, for example, taking a camera by the user are given to the program PR, and the function that generates the three-dimensional image based on the plurality of images may be given to the program PR. The deterioration processing is applied to the three-dimensional image generated by the program PR, and the obtained deterioration image may be displayed in the display section. In this case, the displaying of the deterioration image may be previewed before executing the printing of the three-dimensional image.

The lens intersection direction is not limited to the lens orthogonal direction, and for example, the angle of the lens longitudinal direction may be in a direction of other angles such as 80 degrees, 60 degrees, 110 degrees, etc.

The printing is performed by the print head while the medium is conveyed in the lens longitudinal direction (or linear image longitudinal direction), but the printing may be performed by the print head while the medium is conveyed in the lens orthogonal direction (or the linear image sequence direction).

The position adjustment step in the second embodiment may be performed before the image deterioration step, or may be performed after the display step.

The adjustment step may be performed before the image deterioration step, or may be performed after display step.

The displaying of an image to the display section is not limited to the preview before the printing. An image may be displayed in the display section when the printing is not performed. For example, an image that is viewed through the lens for the purpose of processing the image may be displayed. Further, regardless of printing, an image that is viewed for the purpose of the confirmation how the image is viewed when the three-dimensional image is viewed through the lens may be displayed.

An image may be printed on a medium made of a film or a paper, and the medium after the printing may be bonded to a lens layer sheet instead of the configuration that the printing is performed on the lens sheet having the lens layer and the ink absorbing layer. Also, the lenticular lens layer may be formed by the method that the transparent resin liquid is ejected on the image printing surface of the medium from the nozzle of the liquid ejection head by using the liquid fuel ejection equipment. For example, a photocurable resin (e.g., ultraviolet curable resin) that becomes hardened by the light energy is used as the transparent resin liquid, and he resin liquid formed in the lens-shape on the medium becomes hardened by irradiating light (e.g., ultraviolet light) so as to form the lens. That is, when the three-dimensional image sheet that is capable of providing the three-dimensional visualization through the lens is finally provided, the lens layer may be provided or may not be provided on the medium at the time of printing. In this case, the medium may be a paper, a film, a foil, etc.

It is not limited to the lenticular lens method having the lens layer which has a plurality of cylindrical lenses. It may be a fly-eye lens method. In fact, it may be any lens layer that is capable of providing the three-dimensional visualization. It may be a lens layer (lens array) that, for example, a hemisphere face shaped microconvex lenses are formed on the surface in dense arrangement.

It is acceptable that the printer is provided with at least a device such as a print function, which can perform printing on a medium, a communication function, which is communicable and connectable to a device such as a mobile terminal, etc. For example, it is not limited to a printer, and it may be a multifunction machine. Also, the printer may be an ink-jet type, a dot impact type, or a laser type. Further, the printer may be a serial printer, a line printer, or a page printer.

Further, the printer according to the aforementioned embodiments is provided with a recording section storing the aforementioned program, a computer executing the aforementioned program, and a display section displaying an image generated by the computer. With such structure, when the aforementioned programs are executed by the computer, the same working effect can be obtained.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A virtual displaying method of a three-dimensional image for displaying at least one image of a plurality of images, the virtual displaying method comprising:
   applying a deterioration processing, by a processor, to image data configuring the at least one image of the plurality of the images that configure a virtual three-dimensional image providing a three-dimensional visualization through a lens layer having a plurality of lenses, the image data including color information and α value that represents a transparency in each pixel, the applying of the deterioration process including a semi-transmissive processing to increase a level of the transparency of the image data of the at least one image; and
   displaying, in a single display, the at least one image obtained by the deterioration processing by the processor.

2. The virtual displaying method of the three-dimensional image according to claim 1, wherein
   the displaying of the at least one image includes displaying at least more than or equal to two images in the plurality of the images that include a main image and the at least one image that is obtained by deterioration process, and
   the deterioration processing includes composing the at least one image and the main image such that the main image is deteriorated.

3. The virtual displaying method of the three-dimensional image according to claim 2, wherein
   the semi-transmissive processing is applied to the at least one image, and
   the deterioration processing further includes a blurring processing applied to the at least one image and the main image.

4. The virtual displaying method of the three-dimensional image according to claim 3, wherein
   the virtual three-dimensional image is a change image that changes a plurality of the images depending on an angle viewing through the lens layer, and
   the deteriorating of the at least one image includes increasing levels of the transparency for the plurality of the images that include the at least one image and the main image, as a disparity relative to the main image increases.

5. The virtual displaying method of the three-dimensional image according to claim 1, wherein
   the displaying of the at least one image includes previewing the virtual three-dimensional image in the single display before printing in a printer, and
   the applying of the deterioration processing includes, when a print mode in which the virtual three-dimensional image is printed in the printer is a high image quality mode, lowering a deterioration degree of the image in comparison with a low image quality mode.

6. The virtual displaying method of the three-dimensional image according to claim 2, wherein
   the applying of the deterioration processing includes applying the deterioration processing to, in a plurality of pixels configuring the at least one image, a pixel of which a pixel value exceeds a threshold value in a darker side in a print color system in which the at least one image is color-converted, and composing the pixel after the deterioration processing are composed with the main image.

7. The virtual displaying method of the three-dimensional image according to claim 3, wherein
the virtual three-dimensional image is configured by arranging division compression images of each of the plurality of the images along an arrangement direction of the lenses, and
the applying of the deterioration processing includes applying the deterioration processing to, in the at least one image, a part corresponding to an end part of a division compression image arranged adjacent to a division compression image of the main image, the end part being close to the division compression image of the main image side, and composing the part after the deterioration processing is composed with the main image.

8. The virtual displaying method of the three-dimensional image according to claim 2, wherein
the virtual three-dimensional image is a change image including the plurality of the images, and
the applying of the deterioration processing includes, in the plurality of the images configuring the change image, when one image of which a division compression image is arranged at an end of a lens is the main image, applying the deterioration processing to an image corresponding to an adjacent division compression image arranged in an end of an adjacent side in a lens adjacent to the lens, and the image after the deterioration processing is composed with the main image.

9. The virtual displaying method of the three-dimensional image according to claim 2, wherein
the virtual three-dimensional image virtualizes the three-dimensional image drawn by dots in a plurality of sizes, and
the applying of the deterioration processing includes applying the semi-transmissive processing that reduces a transparency, in comparison with other parts, to a part that includes the largest dot in the plurality of the sizes in the at least one image.

10. The virtual displaying method of the three dimensional image according to claim 1, wherein
the virtual three-dimensional image is a stereoscopic image including an image for left eye and an image for right eye as the plurality of the images, and
the deterioration processing is applied to at least one of the image for left eye and the image for right eye, which is not the main image to be displayed in the single display in the image for left eye and the image for right eye, and the at least one of the image for left eye and the image for right eye which the deterioration processing has been applied to and the main image are composed.

11. The virtual displaying method of the three-dimensional image according to claim 10, wherein
the lens layer is a lenticular lens, and
the virtual displaying method further comprises, before the applying of the deterioration processing or after the displaying of the at least one image, position-adjusting a first stereoscopic object and a second stereoscopic object in a lens longitudinal direction until a displacement amount between the first stereoscopic object included in the image for left eye and the second stereoscopic object included in the image for right eye in the lens longitudinal direction is fit within an acceptable range when the displacement amount exceeds the acceptable range.

12. The virtual displaying method of the three-dimensional image according to claim 11, further comprising trimming by removing a part that does not form the virtual three-dimensional image in the plurality of the images after the position-adjusting.

13. The virtual displaying method of the three-dimensional image according to claim 11, wherein
the position-adjusting includes position-adjusting the first stereoscopic object and the second stereoscopic object based on an instruction from an operating section operated by a user.

14. The virtual displaying method of the three-dimensional image according to claim 11, wherein
the position-adjusting includes calculating the displacement amount of the first and second stereoscopic objects in the lens longitudinal direction from a position of each of the first and second stereoscopic objects obtained by performing a characteristic extraction to the image for left eye and the image for right eye, and position-adjusting the image for left eye and the image for right eye in the lens longitudinal direction until the displacement amount is fit in the acceptable range.

15. The virtual displaying method of the three-dimensional image according to claim 11, further comprising adjusting a specific image that is a part in the plurality of images configuring the virtual three-dimensional image, and reflecting a result of the adjusting to an image other than the specific image in the plurality of the images, wherein
the adjusting of the specific image and the reflecting of the adjustment result are performed before the applying of the deterioration processing or after the displaying of the at least one image.

16. The virtual displaying method of the three-dimensional image according to claim 1, wherein
the applying of the deterioration processing includes not increasing of a level of transparency for the main image.

* * * * *